United States Patent [19]
Hashimoto et al.

[11] Patent Number: 6,064,578
[45] Date of Patent: May 16, 2000

[54] POWER CONVERSION SYSTEM

[75] Inventors: Takashi Hashimoto, Saitama-ken; Masaki Miyairi; Akio Sekimoto, both of Tokyo, all of Japan

[73] Assignee: Kabushiki Kaisha Toshiba, Kawasaki, Japan

[21] Appl. No.: 09/241,635

[22] Filed: Feb. 2, 1999

[30] Foreign Application Priority Data

Feb. 2, 1998 [JP] Japan .................................. 10-021254

[51] Int. Cl.[7] .................................................. H02M 3/335
[52] U.S. Cl. ................................................................ 363/16
[58] Field of Search ................................ 363/16, 17, 55, 363/56, 95, 97, 131

[56] References Cited

U.S. PATENT DOCUMENTS

| | | | |
|---|---|---|---|
| 4,572,969 | 2/1986 | Hellegaard et al. ................ | 307/254 |
| 5,063,488 | 11/1991 | Harada et al. ....................... | 363/16 |
| 5,155,430 | 10/1992 | Gulczynski ........................... | 323/224 |
| 5,621,625 | 4/1997 | Bang .................................... | 363/21 |

*Primary Examiner*—Matthew Nguyen
*Attorney, Agent, or Firm*—Oblon, Spivak, McClelland, Maier & Neustadt, P.C.

[57] ABSTRACT

A capacitor 8 is connected in parallel to both ends of two series-connected semiconductor devices 1, the connecting terminals of the capacitor are arranged so that they become immediately close to the terminal positions of the semiconductor devices 1, inductance of a loop circuit comprising the semiconductor devices 1 and capacitors 8 is suppressed o below 250 nH and thus, a semiconductor switching circuit is constructed. Three sets of this semiconductor switching circuit are connected in parallel with each other, both ends of upper and lower series-connected semiconductor devices in the semiconductor switching circuit are made the main circuit inputs or outputs and the intermediate connecting point of the upper and lower semiconductor devices is made the main circuit output or input and using the capacitors 8 as filter capacitors and surge voltage absorbing capacitors and thus, a power converter is constructed by only two kinds of capacitors and semiconductors.

32 Claims, 22 Drawing Sheets

DC Supply Voltage =1800V
Breaking Current =2300A

POWER CONVERSION SYSTEM

BACKGROUND OF THE INVENTION

1. Field of the Invention

The present invention relates to a power conversion system.

2. Description of the Related Art

FIG. 25 shows a circuit diagram of a power conversion system for cars like a converter circuit and an inverter circuit using semiconductor switching devices, for instance, GTO so far available and a block diagram of the system is shown in FIG. 26. A conventional power conversion system for cars is connected with a snubber circuit comprising a snubber diode 2, snubber condenser or capacitor 3, and a snubber resistor 4 at both ends of a semiconductor device 1. The snubber diode 2 and the snubber capacitor 3 are connected in series and both ends of these are connected in parallel to both ends of the semiconductor device 1. The snubber resistor 4 is connected to the snubber diode 2 in parallel.

This snubber circuit is for suppressing voltage applied to both ends of the semiconductor device 1 when it is switched within its rated voltage and it is needed to reduce the inductance of a looped circuit comprising the semiconductor device 1, snubber diode 2 and snubber capacitor 3. Therefore, it becomes necessary to arrange the snubber diode 2 and the snubber capacitor 3 immediately close to the semiconductor device 1. The snubber resistor 4 is provided for the purpose of discharging energy accumulated in the snubber capacitor 3 and is arranged at a portion (an opening portion) of the system to communicate with the atmosphere likewise cooling fins of a semiconductor cooler 5 in many cases by considering heat radiation.

A switching command is output from a gate amplifier 6 and input to the semiconductor device 1. Further, for the power for a main circuit of a power converter, power of stabilized voltage is supplied from a filter capacitor 7 connected in parallel to a power converter. The filter condenser or capacitor 7 is connected to a power source outside the system.

In case of a conventional power conversion system for use in railway cars in the above-mentioned structure, it was needed to arrange two kinds of parts, that is, the snubber diode 2 and the snubber capacitor 3 immediately close to the semiconductor device 1 and by bringing the terminal positions of these parts close to each other so as to reduce inductance of connected wires as could as possible. However, in order to arrange two kinds of different parts closely each other, special shaped parts had to adopt and security of reliability and reduction in part costs using standard shaped parts were difficult and furthermore, the narrowed spaces between parts impeded the flow of heat generated inside the system, and a problem of temperature rise in the system was generated. Further, regarding the construction, the system was not rationally assembled and if troubles occurred, the inspection and removal of parts were difficult.

In addition, as heat to be radiated to the outside of the system, it is necessary to radiate not only heat generated from the semiconductor device 1 but also heat generated from the snubber resistor 4 and for instance, in case of a power conversion system that is installed under the floor of a railway carriage, the temperature under the floor is raised by the exhaust heat from the system and adversely affected the feeder line under the floor not a little. Therefore, it was so far demanded to realize a power conversion system that is highly reliable, small in size, light in weight, simple in construction and capable of suppressing a price low.

However, in order to realize such a power conversion system with a snubber circuit eliminated, it was necessary to solve technical problems shown below. In the main circuit for electric car driving, surge voltage Vp is generated when large current I of 2300A is cut off even when DC voltage is 1800V as shown in the chart in FIG. 27. So, for such a power transistor as GTO that is adopted in an inverter circuit and a converter circuit as a power conversion system, a power transistor of a lower rated value that suppresses the peak of surge voltage Vp by absorbing surge voltage by providing a snubber circuit was so far adopted.

However, in case of such a voltage driving type high-frequency switching device as IGBT (Insulated Gate Bipolar Transistor) or IEGT (Injection Enhanced Gate Transistor) that is capable of high-speed switching at continuous 700 Hz (a conventional GTO is a current driving type switching device capable of switching at about continuous 500 Hz), when inductance of a loop circuit enclosed by conductors connecting a switching device and a capacitor is reduced by reducing internal inductance of a surge voltage absorbing capacitor and that of conductors as could as possible, it becomes possible to construct a semiconductor switching circuit requiring no snubber circuit.

In other words, as shown in FIG. 28, DC voltage for a main circuit for an electric car is generally 1800V and when a semiconductor switching device of rated voltage 3300V is adopted and the system is so set as to suppress surge voltage Vp generated when breaking the semiconductor switching circuit by breaking current 2300A to suppress to below 3000V with a margin of about 10% against the rated voltage of the switching device, it becomes possible to compose a power converter with less a snubber circuit when an inductance of the loop circuit is suppressed to 250 nH or below.

In order to suppress an inductance of the loop circuit to below 250 nH, when a capacitor having an internal low inductance of about 50 nH is adopted and a circuit is in a physical structure to suppress an overall inductance of conductors to below 200 nH, it is possible to realize a circuit satisfying the condition. So, in order to realize such a circuit, it is needed to bring surge voltage absorbing capacitors and semiconductor switching devices as close as possible and also, bring conductors connecting semiconductor devices each other and conductors connecting semiconductor switching devices and capacitors so that an area enclosing a loop circuit is made small and lengths of conductors are made short.

SUMMARY OF THE INVENTION

The present invention has been made according to the consideration and it is an object to provide a power conversion system requiring no snubber circuit that was so far indispensable, with less number of parts and kinds, remarkably improved reliability, small in size and light in weight and capable of achieving low price.

In order to achieve the above-mentioned object, the power conversion system according to the invention is characterized in that capacitors that serve as capacitors for filtering and absorbing surge voltage are connected to both ends of series-connected semiconductor devices that are voltage driven high frequency switching devices in parallel, the connecting terminals of this capacitors are arranged so that they are brought immediately close to the terminal positions of the semiconductor devices, more than two sets of semiconductor switching circuits with inductance of which loop circuit comprising the semiconductor devices and capacitors reduced to below 250 nH are connected in parallel and both ends and an intermediate connecting point of the series-connected semiconductor devices in each semiconductor switching circuits are used as the main circuit terminals for external connection.

According to the invention, it is possible to construct a main circuit of a power conversion portion by eliminating a snubber circuit that was adopted so far as a conventional peripheral circuit of semiconductor device and using only two kinds of components; that is, a closely arranged capacitor serving as a filter capacitor and surge voltage absorbing capacitor and the semiconductor device.

When more than two units of the same capacitors in the same capacity connected in parallel are used as capacitors, inductance can be reduced when the capacitors are connected in parallel and a power conversion system with a good switching capacity can be constructed.

When the capacitor uses its case as either one of the electrode terminals of its capacitor, inductance of the capacitor itself can be made low.

When the capacitor is arranged so that its electrode terminal faces the direction of the semiconductor devices, inductance at the connecting point of the capacitor and the semiconductor devices can be reduced.

When the terminals of the capacitor is arranged immediately close to the intermediate position of the semiconductor devices that are connected in series, it is possible to reduce inductance at the connecting portion of the capacitor and the semiconductor devices.

When the terminals of the capacitor are arrange immediately close to both end positions of the semiconductor devices that are connected in series, it is possible to reduce inductance at the connecting portion of the capacitor and the semiconductor devices.

Further, a power conversion system according to the invention is characterized in that the first capacitor for surge voltage absorbing and the second capacitor as a filter capacitor with the capacity larger than that of the first capacitor are connected to both ends of the series-connected semiconductor devices that are voltage driven high frequency switching devices, the first capacitor is arranged at a position closer to the semiconductor devices than the second capacitor, more than two sets of semiconductor switching circuits with inductance of which loop circuit comprising the semiconductor devices and the first capacitor is reduced to below 250 nH are connected in parallel, and both ends and intermediate connecting point of the series-connected semiconductor devices in each semiconductor switching circuits are used as the main circuit terminals for the external connection.

According to the invention, as the first capacitor small in size and capacity than a filter capacitor is provided more immediately close to the semiconductor devices as a filter capacity for absorbing surge voltage in addition to the second capacitor, it is possible to construct a semiconductor switching circuit with the inductance of a looped circuit comprising the semiconductor devices and the first capacitor reduced to below 250 nH and as a result, it becomes possible to eliminate a conventional snubber circuit and construct a main circuit of the power conversion portion only by the semiconductor devices and two kinds of capacitors.

When more than two units of capacitors in the same small capacity are connected in parallel as the first capacitor, it becomes possible to reduce inductance by connecting capacitors in parallel and construct a power conversion system of good switching characteristic.

When the case of the first capacitor is used as either one of the electrode terminals of the first capacitor, it is possible to reduce inductance of the capacitor itself.

When the electrode terminals of the first capacitor are arranged to face the direction of the semiconductor devices, it is possible to reduce inductance at the connecting portion of the first capacitor and the semiconductor devices.

When as the terminals of the first capacitor are arranged immediately close to the intermediate position of the semiconductor devices that are connected in series, it is possible to reduce inductance of the connecting portion of the first capacitor and the semiconductor devices.

When as the terminals of the first capacitor are arranged immediately close to both ends of the semiconductor devices that are connected in series, it is possible to reduce inductance of the connecting portion of the first capacitor and the semiconductor devices.

When the semiconductor devices, the first capacitor and the second capacitor are arranged hierarchically, the first capacitor is connected to both ends of the semiconductor devices that are connected in series and the second capacitor is connected to the connecting points, that is, the electrode terminals of the first capacitor, the second capacitor that is as a filter capacity is connected to the first capacitor side, that serves as a phase capacitor arranged most immediately close to the semiconductor devices that are connected in series so that the effect by the switching operation of other phase semiconductor device is eliminated and the shape of conductors for connecting between the capacitors and the semiconductor devices can be simplified.

When the number of the second capacitors is reduced less than the number of sets of the semiconductor switching circuits that are connected in parallel and more than two sets of the semiconductor switching circuits connected in parallel are connected commonly to at least one unit of the second capacitor, it is possible to reduce the number of parts by integrating the second capacitors that serve as filter capacitors without providing it for each phase.

When the second capacitor is constructed as a filter capacitor that has a required capacity using a main capacitor in the main circuit unit including semiconductor devices and an auxiliary capacitor installed at the outside of the main circuit unit and therefore, it is possible to construct a filter capacitor that has a proper capacity corresponding to a system by using a capacitor of a proper capacity as an auxiliary capacitor outside the main circuit unit and the main circuit can be standardized.

Further, a power conversion system according to the invention is characterized in that including more than two sets of semiconductor switching circuits connected in parallel comprising surge voltage absorbing capacitor connected in parallel to both ends of series-connected semiconductor devices that are voltage driven high-frequency switching devices and both ends and the intermediate connecting point of the series-connected semiconductor devices in the semiconductor switching circuits are made the main circuit terminal for external connection, wherein the semiconductor devices are press fit shape semiconductor devices of which both surfaces serve as the electrode surfaces, the positive pole sides or the negative pole sides of each semiconductor devices of an upper arm side and a lower arm side in the series-connected semiconductor devices of the semiconductor switching circuits are press fitted by way of an insulating plate having large thermal conductivity on the same plane of semiconductor device cooler, and the negative poles of the upper arm side semiconductor devices and the positive poles of the lower arm side semiconductor devices are connected by conductors and the positive poles of the upper arm side semiconductor devices and the negative poles of the lower arm side semiconductor devices are connected by one set of conductors which are close to both sides of the capacitors.

Further, a power conversion system according to the invention is characterized in that including more than two sets of semiconductor switching circuits connected in parallel comprising surge voltage absorbing capacitors connected in parallel to both ends of series-connected semiconductor devices that are voltage driven high-frequency switching devices and both ends and the intermediate connecting point of the series-connected semiconductor devices in the semiconductor switching circuits are made the main circuit terminal for external connection, wherein the semiconductor devices are press fit shape semiconductor devices of which both surfaces serve as the electrode surfaces, the negative pole side of the upper arm side semiconductor device and the positive side of the lower arm side semiconductor device of the series-connected semiconductor devices of the semiconductor switching circuits are press fitted on the same plane of the semiconductor device cooler of good conductivity, and the positive pole of the upper arm side semiconductor device and the negative pole of the lower arm side semiconductor device are connected respectively by one set of conductors that are close to both terminals of the capacitors.

Further, a power conversion system according to the invention is characterized in that including more than two sets of semiconductor switching circuits connected in parallel comprising surge voltage absorbing capacitors connected in parallel to both ends of series-connected semiconductor devices that are voltage driven high-frequency switching devices and both ends and the intermediate connecting point of the series-connected semiconductor devices in the semiconductor switching circuits as the main circuit terminals for external connection, wherein the semiconductor devices are press fit shape semiconductor devices of which both surfaces serve as the electrode surfaces, the negative pole side of the upper arm side semiconductor device and the positive pole side of the lower arm side semiconductor devices of the series-connected semiconductor devices of the semiconductor switching circuits are press fitted on the same plane of the semiconductor device cooler with a common conductor put between them, and the positive pole of the upper arm side semiconductor device and the negative pole of the lower arm side semiconductor device are connected respectively by one set of conductors that are close to both terminals of the capacitors.

Further, a power conversion system according to the invention is characterized in that including more than two sets of semiconductor switching circuits connected in parallel comprising surge voltage absorbing capacitors connected in parallel to both ends of series-connected semiconductor devices that are voltage driven high-frequency switching devices and both ends and the intermediate connecting point of the series-connected semiconductor devices in the semiconductor switching circuits as the main circuit terminals for external connection, wherein the semiconductor devices are press fitted shape semiconductor devices of which both surfaces serve as the electrode surfaces, the positive pole sides of the upper arm side semiconductor devices and the negative pole sides of the lower arm side semiconductor devices of the series-connected semiconductor devices of the semiconductor switching circuits are press fitted on the same plane of the semiconductor device cooler by way of an insulating plate of large thermal conductivity, and the negative pole sides of the upper arm side semiconductor devices and the positive pole sides of the lower arm side semiconductor devices are connected by conductors, and the positive pole of the upper arm side semiconductor device and the negative pole of the lower arm side semiconductor device are connected respectively by one set of conductors that are close to both terminals of the capacitors.

According to the above mentioned inventions, using press fit state semiconductor of which both sides become the electrode surfaces, each switching circuit is constricted by assembling the semiconductor devices and conductors hierarchically to the cooler and fixed by compressing the entirety from the outside, the semiconductor devices and capacitors can be closely arranged in each semiconductor switching circuit, inductance of a loop circuit comprising semiconductor devices, capacitors and conductors can be suppressed to below 250 nH, and it is possible to eliminate a snubber circuit and construct a power conversion portion only by two kinds of circuit components of capacitors and semiconductor devices.

Further, a power conversion system according to the invention is characterized in that including more than two sets of semiconductor switching circuits connected in parallel comprising surge voltage absorbing capacitors connected in parallel to both ends of series-connected semiconductor devices that are voltage driven high-frequency switching devices and both ends and the intermediate connecting point of the series-connected semiconductor devices in the semiconductor switching circuits as the main circuit terminals for external connection, wherein the semiconductor devices are modular type semiconductor devices provided with the positive pole terminals and the negative pole terminals on one of the surfaces and the opposite surfaces are flat cooling and mounting surfaces, the series-connected semiconductor devices of the semiconductor switching circuits are mounted on the same plane of the semiconductor device coolers with the negative terminal sides of the upper arm side semiconductor devices and the positive pole sides of the lower arm side semiconductor devices arranged in parallel with and adjoining each other in the same directions, and the negative pole sides of the upper arm side semiconductor devices and the positive pole sides of the lower arm side semiconductor devices are connected by conductors, and the positive pole of the upper arm side semiconductor device and the negative pole of the lower arm side semiconductor device are connected respectively by one set of conductors that are close to both terminals of the capacitors.

Further, a power conversion system according to the invention is characterized in that including more than two sets of semiconductor switching circuits connected in parallel comprising surge voltage absorbing capacitors connected in parallel to both ends of series-connected semiconductor devices that are voltage driven high-frequency switching devices and both ends and the intermediate connecting point of the series-connected semiconductor devices in the semiconductor switching circuits as the main circuit terminals for external connection, wherein the semiconductor devices are modular type semiconductor devices provided with the positive pole terminals and the negative pole terminals on one of the surfaces and the opposite surfaces are flat cooling and mounting surfaces, the series-connected semiconductor devices of the semiconductor switching circuits are mounted on the same plane of the semiconductor device coolers in the arrangement so that the line connecting the positive pole terminals and the negative pole terminals of the upper arm side semiconductor devices becomes in parallel with the line connecting the positive pole terminal and the negative pole terminal of the lower side arm semiconductor devices and the positive and negative directions become opposite each other, and the negative pole sides of the upper arm side semiconductor devices and the positive pole sides of the lower arm side semiconductor devices are connected by conductors, and the positive pole of the upper arm side semiconductor device and the negative pole of the lower arm side semiconductor device are connected respectively by one set of conductors that are close to both terminals of the capacitors.

According to the above mentioned inventions as each semiconductor switching circuit is constructed using modular semiconductor devices with the positive and negative pole terminals provided on one of the surfaces and the other surface becomes the flat cooling and mounting surface and semiconductor devices are horizontally arranged and the cooler is mounted on the mounting surface side and between the positive and negative pole terminals on the opposite surface and the terminals and capacitors are connected by conductors, the semiconductor devices and the capacitors can be arranged closely in each semiconductor switching circuit, inductance of a loop circuit comprising semiconductor devices, capacitors and conductors can be suppressed to below 250 nH, and it is possible to eliminate a snubber circuit and construct a main circuit of a power conversion portion only by only two kinds of circuit components; capacitors and semiconductor devices.

When semiconductor devices are brought in contact with separate semiconductor device coolers, it is possible to cool semiconductor devices individually without subject to the heat generation of other semiconductor devices and further, it is also possible to prepare a cooler provided with a cooling capability corresponding to the heat generating state of each semiconductor device, thus improving the cooling effect of the semiconductor devices.

When the radiation capacity of the semiconductor device cooler provided at the downstream side of the flow of air warmed by the heat radiation of the semiconductor cooler is made higher than that of the semiconductor device cooler at the upper stream side, it is possible to balance the temperature rise of each cooler and effectively cool the semiconductor devices.

When the series-connected semiconductor devices are brought in contact with the same semiconductor device cooler in the state shifted to the upper stream side of the air warmed by the heat radiated from that semiconductor device cooler, the temperature rises at various parts of the cooler are made uniform and the semiconductor devices can be effectively cooled.

Further, a power conversion system according to the invention is characterized in that including more than two sets of semiconductor switching circuits connected in parallel comprising surge voltage absorbing capacitors connected in parallel to both ends of series-connected semiconductor devices that are voltage driven high-frequency switching devices and both ends and the intermediate connecting point of the series-connected semiconductor devices in the semiconductor switching circuits as the main circuit terminals for external connection, wherein the semiconductor devices are press fit semiconductor devices of which both surfaces serve as the electrode surfaces, the negative pole side of the upper arm side semiconductor device and the positive pole side of the lower arm side semiconductor device of the series-connected semiconductor devices of the semiconductor switching circuit are press fitted to the front and back of the heat collecting block portion of the semiconductor device cooler having a flat and good conductive heat collecting block portion and a radiating portion to radiate the heat collected by this heat collecting block portion, respectively, the positive pole of the upper arm side semiconductor device and the negative pole of the lower arm side semiconductor device are connected by one set of conductors that are close to both terminals of the capacitor, respectively.

According to the invention, as press fit type semiconductor devices of which both surfaces become the electrode surfaces are used as semiconductor devices, coolers that have a flat and good conductive heat collecting block portion and a heat radiating portion to radiate heat collected by the heat collecting block portion are used as coolers, the semiconductor devices and conductors are assembled to this cooler heat collecting block portion in the laminated structure and the semiconductor switching circuits are constructed by compressing and fixed the entirety from the outside, the semiconductor devices and capacitors are arranged closely in each semiconductor switching circuit, inductance of a loop circuit comprising the semiconductor devices, capacitors and conductors can be suppressed to below 250 nH and it is possible to eliminate a snubber circuit and construct the main circuit of the power conversion portion only by two circuit components; capacitors and semiconductor devices. Furthermore, as the good conductive heat collecting block portion of the cooler serves is also used for connecting for the semiconductor devices, it becomes possible to make the intermediate connecting portion between the upper and lower arm semiconductor devices most short, simplify the construction and reduce inductance of the loop circuit.

Further, a power conversion system according to the invention is characterized in that including more than two sets of semiconductor switching circuits connected in parallel comprising surge voltage absorbing capacitors connected in parallel to both ends of series-connected semiconductor devices that are voltage driven high-frequency switching devices and both ends and the intermediate connecting point of the series-connected semiconductor devices in the semiconductor switching circuits as the main circuit terminals for external connection, wherein the semiconductor devices are press fit semiconductor devices of which both surfaces serve as the electrode surfaces, the negative pole side of the upper arm side semiconductor device and the positive pole side of the lower arm side semiconductor device of the series-connected semiconductor devices of the semiconductor switching circuit are press fitted to the front and back of the heat collecting block portion of the semiconductor device cooler having a flat and good conductive heat collecting block portion and a radiating portion to radiate the heat collected by this heat collecting block portion, respectively, the heat collecting block portions of separate two semiconductor device coolers that have flat good conductive heat collecting block portions and radiating portions to radiate the heat collected by this heat collecting block portions are press fit to the positive pole side of the upper arm side semiconductor device and the negative pole side of the lower arm side semiconductor device, respectively, and the heat collecting block portion of the separate semiconductor device cooler to which the positive pole side of the upper arm side semiconductor device is press fitted and the heat collecting bock portion of the separate semiconductor device cooler to which the negative pole side of the lower arm side semiconductor device is press fitted are connected to both terminals of the capacitor by one set of conductors that are close to each other.

According to the invention, as press fit type semiconductor devices of which both surfaces become the electrode surfaces are used as semiconductor devices, coolers that have a flat and good conductive heat collecting block portion and a heat radiating portion to radiate heat collected by the heat collecting block portion are used as coolers, the semiconductor devices and conductors are assembled to this cooler heat collecting block portion in the laminated structure and further, a heat collecting block portion of a separate cooler is assembled to the outside of the upper and lower semiconductor devices separately in the laminated structure and the semiconductor switching circuits are constructed by compressing and fixing the entirety from the outside, the semiconductor devices and capacitors are arranged closely in each semiconductor switching circuit, inductance of a loop circuit comprising the semiconductor devices, capacitors and conductors can be suppressed to below 250 and it is possible to eliminate a snubber circuit and construct the main circuit of the power conversion portion only by two kinds of circuit components; capacitors and semiconductor devices. Furthermore, the power conversion system becomes such a construction to clamp the upper and lower arm semiconductor devices of each semiconductor switching circuit by the heat collecting block portions of the coolers from the front and back surfaces and it is therefore possible to increase the cooling effect of the semiconductor devices.

Further, a power conversion system according to the invention is characterized in that including more than two sets of semiconductor switching circuits connected in parallel comprising surge voltage absorbing capacitors connected in parallel to both ends of series-connected semiconductor devices that are voltage driven high-frequency switching devices and both ends and the intermediate connecting point of the series-connected semiconductor devices in the semiconductor switching circuits as the main circuit terminals for external connection, wherein the semiconductor devices are press fit semiconductor devices of which both surfaces serve as the electrode surfaces, the same positive pole surface sides or the negative pole surface sides of the series-connected semiconductor devices of the semiconductor switching circuits are press fitted to the front and back of the heat collecting block portion of the semiconductor device cooler having the flat heat collecting block portion and the radiating portion to radiate the heat collected by this heat collecting block portion by way of electric insulating plate having large thermal conductivity, respectively, the negative pole side of the upper arm side semiconductor device and the positive pole side of the lower arm side semiconductor device of the series-connected semiconductor devices are connected by conductors, and the positive pole of the upper arm side semiconductor device and the negative pole of the lower arm side semiconductor device are connected to both terminals of the capacitor by one set of conductors that are close to each other.

According to the invention, as press fit type semiconductor devices of which both surfaces become the electrode surfaces are used as semiconductor devices, coolers that have a flat heat collecting block portion and a heat radiating portion to radiate heat collected by the heat collecting block portion are used as coolers, the semiconductor devices and conductors are assembled to this cooler heat collecting block portion in the laminated structure via an insulating plate having a large thermal conductivity and the semiconductor switching circuits are constructed by compressing and fixing the entirety from the outside, and therefore, the semiconductor devices and capacitors can be arranged closely in each semiconductor switching circuit, and inductance of the loop-shape circuit comprising the semiconductor devices, capacitors and conductors can be suppressed to below 250 nH and it is possible to eliminate a snubber circuit and construct the main circuit of the power conversion portion by only two kinds of circuit components; capacitors and semiconductor devices. Furthermore, as the semiconductor devices and conductors are press fitted to the heat collecting block portion of the cooler via an insulating plate, it is possible to cool the semiconductor devices effectively and insulate the cooler.

Further, a power conversion system according to the invention is characterized in that including more than two sets of semiconductor switching circuits connected in parallel comprising surge voltage absorbing capacitors connected in parallel to both ends of series-connected semiconductor devices that are voltage driven high-frequency switching devices and both ends and the intermediate connecting point of the series-connected semiconductor devices in the semiconductor switching circuits as the main circuit terminals for external connection, wherein the semiconductor devices are press fit semiconductor devices of which both surfaces serve as the electrode surfaces, the same positive pole surface sides or the negative pole surface sides of the series-connected semiconductor devices of the semiconductor switching circuits are press fitted to the front and back of the heat collecting block portion of the semiconductor device cooler having the flat heat collecting block portion and the radiating portion to radiate the heat collected by this heat collecting block portion by way of electric insulating plate having large thermal conductivity, respectively, the heat collecting block portions of separate two semiconductor device coolers that have flat heat collecting block portions and radiating portions to radiate the heat collected by this heat collecting block portions are press fit to the electrode surface positioned at the outside of the upper arm side semiconductor device and the electrode side positioned at the outside of the lower arm side semiconductor device, respectively by way of an insulating plate having large thermal conductivity, the negative pole side of the upper arm side semiconductor device and the positive pole side of the lower arm side semiconductor device of the series-connected semiconductor devices are connected by conductor, and the positive pole of the upper arm side semiconductor device and the negative pole of the lower arm side semiconductor device are connected to both terminals of the capacitor by one set of conductors that are close to each other.

According to the above invention, as press fit type semiconductor devices of which both surfaces become the electrode surfaces are used as semiconductor devices, coolers that have a flat heat collecting block portion and a heat radiating portion to radiate heat collected by the heat collecting block portion are used as coolers, the semiconductor devices and conductors are assembled to this cooler heat collecting block portion in the laminated structure via an insulating plate having a large thermal conductivity and the semiconductor switching circuits are constructed by compressing and fixing the entirety from the outside, and therefore, the semiconductor devices and capacitors can be arranged closely in each semiconductor switching circuit, and inductance of the loop-shape circuit comprising the semiconductor devices, capacitors and conductors can be suppressed to below 250 nH and it is possible to eliminate a snubber circuit and construct the main circuit of the power conversion portion by only two kinds of circuit components; capacitors and semiconductor devices. Furthermore, as the power conversion system becomes such structure to clamp the upper and lower arm semiconductor devices of the semiconductor switching circuits by the heat collecting block portion of the cooler from the front and back surfaces, it is possible to increase the cooling effect of the semiconductor devices.

Further, a power conversion system according to the invention is characterized in that including more than two sets of semiconductor switching circuits connected in parallel comprising surge voltage absorbing capacitors connected in parallel to both ends of series-connected semiconductor devices that are voltage driven high-frequency switching devices and both ends and the intermediate connecting point of the series-connected semiconductor devices in the semiconductor switching circuits as the main circuit terminals for external connection, wherein the semiconductor device is modular type semiconductor device provided with the positive and negative terminals on one of its surfaces and the opposite surface is a flat cooling and mounting surface, the series-connected semiconductor devices of the semiconductor switching circuits are so arranged that the mount surfaces face each other and the negative pole terminal of one of the semiconductor devices is positioned on the back side of the positive pole terminal of the other semiconductor device, the mounting surface sides of the series-connected semiconductor devices of the semiconductor switching circuits are mounted on the front and back sides of the heat collecting block portions of the semiconductor device cooler that has a flat heat collecting block portion and a radiating portion to radiate the heat collected by this heat collecting block portion, respectively, the negative pole terminal of the upper arm side semiconductor device and the positive pole terminal of the lower arm side semiconductor device of the series-connected semiconductor devices are connected by a conductor, and the positive pole terminal of the upper arm side semiconductor device and the negative pole terminal of the lower arm side semiconductor device are connected to both terminals of the capacitor by one set of conductors that are close to each other.

According to the invention, as a modular type semiconductor device with the positive and negative pole terminals provided on one surface and the other surface is a flat cooling and mounting surface is used, a cooler that has a flat heat collecting block portion and a radiating portion to radiate the heat collected by this heat collecting block portion is used, the mounting surface side of a semiconductor device is mounted to the front and back of the heat collecting block portion of this cooler, the negative pole terminal of the upper arm side semiconductor device and the positive pole terminal of the lower arm side semiconductor device are connected by a conductor, the positive pole terminal of the upper arm side semiconductor device and the negative pole terminal of the lower arm side semiconductor are connected by one set of conductors that are close to both terminal of the capacitor and thus, each semiconductor switching circuit is constructed, the semiconductor devices and the capacitor are arranged closely, inductance of the loop circuit comprising the semiconductor devices, the capacitor and conductors can be suppressed to below 250 nH and it becomes possible to eliminate a snubber circuit and construct the main circuit of the power conversion portion by only two kinds of circuit components; the capacitor and semiconductor devices.

Further, a power conversion system according to the invention is characterized in that including more than two sets of semiconductor switching circuits connected in parallel comprising surge voltage absorbing capacitors connected in parallel to both ends of series-connected semiconductor devices that are voltage driven high-frequency switching devices and both ends and the intermediate connecting point of the series-connected semiconductor devices in the semiconductor switching circuits as the main circuit terminals for external connection, wherein the semiconductor device is a modular type semiconductor device provided with the positive and negative terminals on one of its surfaces and the opposite surface is a flat cooling and mounting surface, the series-connected semiconductor devices of the semiconductor switching circuits are so arranged that the mounting surfaces come to the outside and the positive pole terminal and negative pole terminal face each other, the heat collecting block portions of semiconductor device coolers that have a flat heat collecting block portion and a radiating portion to radiate the heat collected by this heat collecting block portion are mounted on the mounting surfaces of the series-connected semiconductor devices, the negative pole terminal of the upper arm side semiconductor device and the positive pole terminal of the lower arm side semiconductor device of the series-connected semiconductor devices are connected by a conductor, and the positive pole terminal of the upper arm side semiconductor device and the negative pole terminal of the lower arm side semiconductor device are connected to both terminal of the capacitor, respectively by one set of conductors that are close to each other.

According to the above invention, as a modular type semiconductor device with the positive and negative pole terminals provided on one surface and the other surface is a flat cooling and mounting surface is used, a cooler that has a flat heat collecting block portion and a radiating portion to radiate the heat collected by this heat collecting block portion is used, the semiconductor devices are arranged so that the positive pole terminal and the negative pole terminal face each other, a heat collecting block portion of the cooler is separately mounted to the mounting surface at the outside of the these semiconductor devices, the negative pole terminal of the upper arm side semiconductor device and the positive pole terminal of the lower arm side semiconductor device are connected by conductor and further, the positive pole terminal of the upper arm side semiconductor device and the negative pole terminal of the lower arm side semiconductor device are connected to both terminal of the capacitor, respectively by one set of conductors that are close to each other and thus, a semiconductor switching circuit is constructed, it is therefore possible to arrange the semiconductor devices and the capacitor closely in each semiconductor switching circuit and suppress inductance of the looped-shape circuit comprising the semiconductor devices, the capacitor and the conductors to below 250 nH, eliminate a snubber circuit and construct the main circuit of the power conversion portion by one two kinds of circuit components; the capacitor and semiconductor. Furthermore, it is also possible to increase the cooling effect as the semiconductor devices are mounted to individual heat collecting block portion.

When a conductor is connected to one of the filter capacitors that also serves for surge voltage absorbing, a circuit can be constructed only by one kind of capacitor and the number of parts can be sharply reduced.

When a conductor is connected to the first capacitor in a circuit provided with 2 kinds of capacitors; the first capacitor for surge voltage absorbing and the second capacitor as a filter capacitor, it is possible to adopt a capacitor of small size and small capacity with small internal inductance for this first capacitor and it becomes possible to reduce inductance of the looped circuit comprising semiconductor devices, capacitors and conductors.

DETAILED DESCRIPTION OF THE PREFERRED EMBODIMENTS

Hereinafter, preferred embodiments of the present invention will be described in detail with reference to the attached drawings.

First Embodiment

Figure 1:
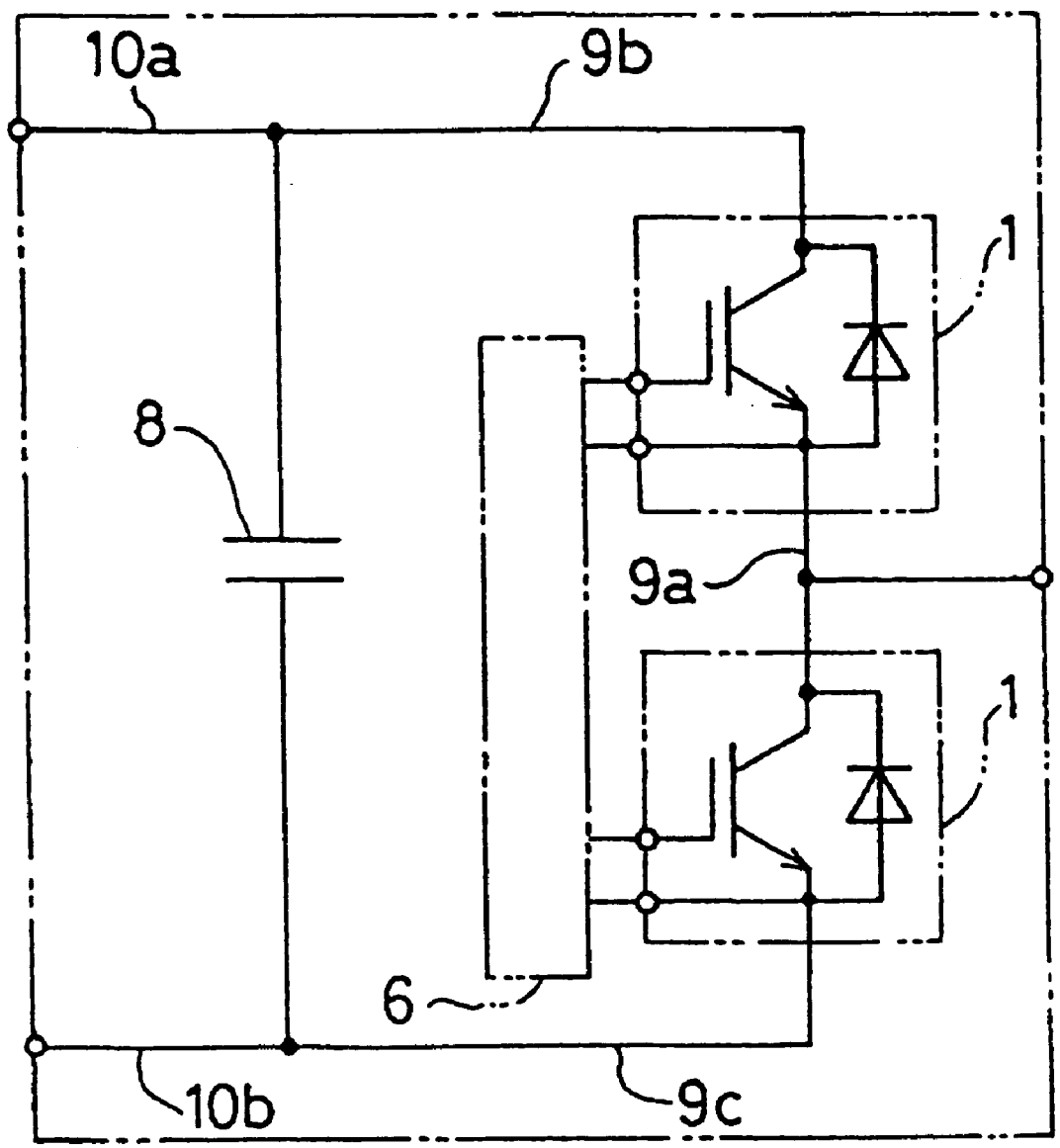
FIG. 1 is a circuit diagram of a semiconductor switching circuit in the first embodiment of the present invention.
Figure 2:
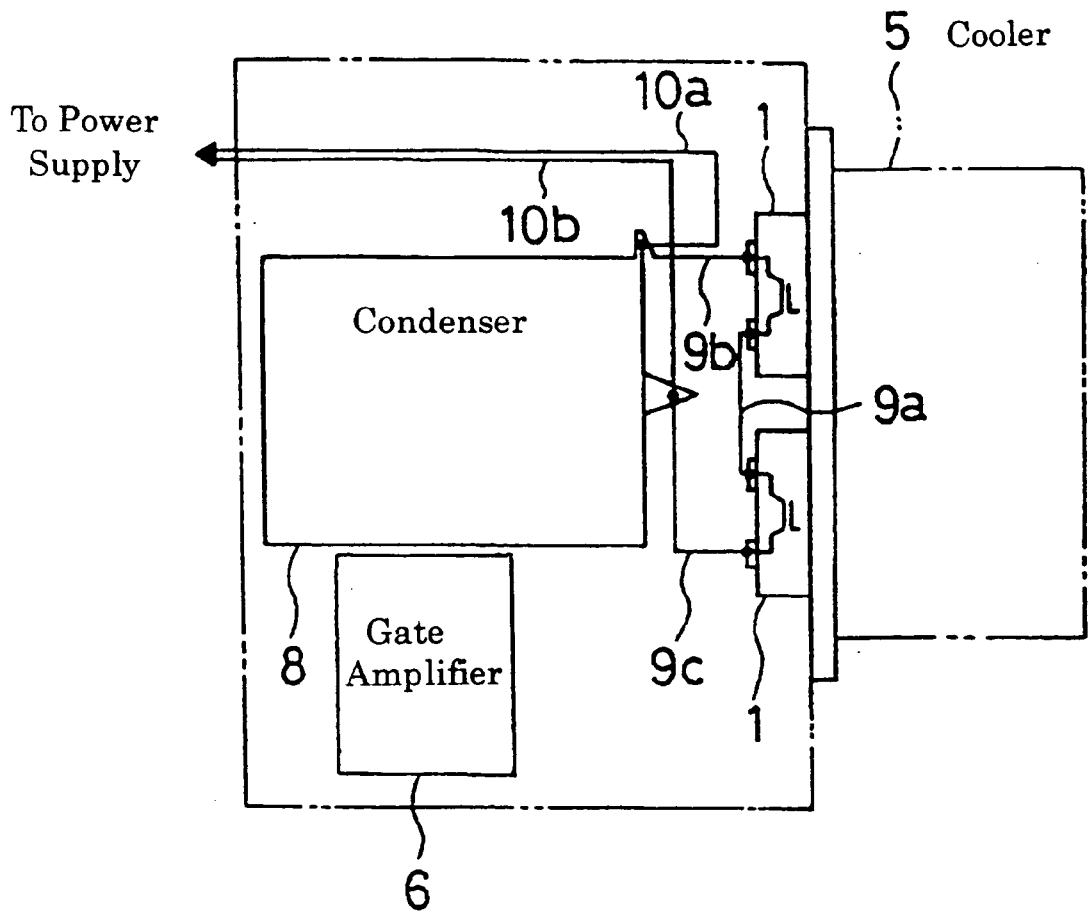
FIG. 2 is a block diagram showing the arrangement of parts in the above-mentioned embodiment.

A circuit diagram of one set of semiconductor switching circuits that are adopted in the power conversion system in the first embodiment is shown in FIG. 1 and its block diagram is shown in FIG. 2. A condenser or a capacitor 8 is connected to both ends of two series-connected semiconductor devices 1 which are voltage driving high-frequency switching devices (rated voltage: above 1.2 kV) such as IGBT and IEGT, and semiconductors 1 and capacitor 8 are connected by conductors 9a, 9b, 9c. A loop circuit is composed by these conductors 9a, 9b, 9c closely positioned each other so as to suppress its inductance to below 250 nH.

Here, a capacitor having a low inductance and the same capacity as a conventional filter capacitor 7 is used as the capacitor 8. The capacitor 8 is connected to an external power source by conductors 10a, 10b and a gate amplifier 6 is connected to the semiconductors 1 to input a switching command.

One of the electrodes of the capacitor 8 uses a terminal and the other electrode uses a case and these electrodes are arranged close to an intermediate connecting point of two series-connected semiconductor devices 1. Further, both electrodes of the capacitor 8 may be arranged close to both ends of two series-connected semiconductor devices 1, respectively (This arrangement is also applicable in the embodiments shown below. Refer to, for instance, the structures shown in FIG. 19 and FIG. 20.)

By providing two or three sets or multiple sets of two or three sets of the semiconductor switching circuits in the structure in parallel, and making an intermediate connecting point side of two series-connected semiconductor devices 1 as the main circuit input point and both ends of the semiconductor devices 1 as the main circuit output points, a converter circuit for converting AC input into DC output is constructed. In this converter circuit, AC input is converted into DC output by inputting a switching command from the gate amplifier 6 to respective semiconductor switching circuit so that each semiconductor device performs the switching operation.

On the contrary, by providing 3 sets or multiple sets of 3 sets of the semiconductor switching circuits in parallel, and making both ends of two series-connected semiconductor devices as the main circuit input points and the intermediate connecting point side of the semiconductor devices as the main circuit output point, an inverter circuit to convert DC input into AC output is constructed. In this inverter circuit, DC input is converted into AC output by inputting a switching command from the gate amplifier 6 to respective semiconductor switching circuit so that each semiconductor device 1 performs the switching operation.

In this case, the inductance of a loop circuit between the capacitor 8 and semiconductor devices 1 is reduced to below 250 nH by adopting a capacitor having a low internal inductance below 50 nH for the capacitor 8, bringing the capacitor 8 and the semiconductor devices 1 close each other as could as possible and at the same time, a inductance of conductors is reduced to below 200 nH by making the lengths of the conductors 9a, 9b, 9c short and bringing them close as could as possible. As a result, it becomes possible to suppress the surge voltage applied to both ends of the semiconductor devices 1 within the rated voltage of the semiconductor devices, prevent the semiconductor devices 1 from being broken by over voltage and assure the satisfactory switching operation. Further, as the capacitor 8 uses a capacitor in the same capacity as the filter capacitor 7 in a conventional system, the capacitor 8 also serves as a filter capacitor to stable feed supply voltage and therefore, the circuit structure becomes simple without requiring a filter capacitor separately.

According to the power conversion system in the first embodiment, a snubber circuit that is a protective circuit around the semiconductor devices can be eliminated and the number of component parts and kinds as a power conversion system can be sharply reduced when compared with a conventional system. Further, as there is no snubber resistor, heat loss can be reduced and coupled with reduced in the number of component parts and simplified structure, the downsized, light weighted and low priced system can be realized.

Second Embodiment

Figure 3:
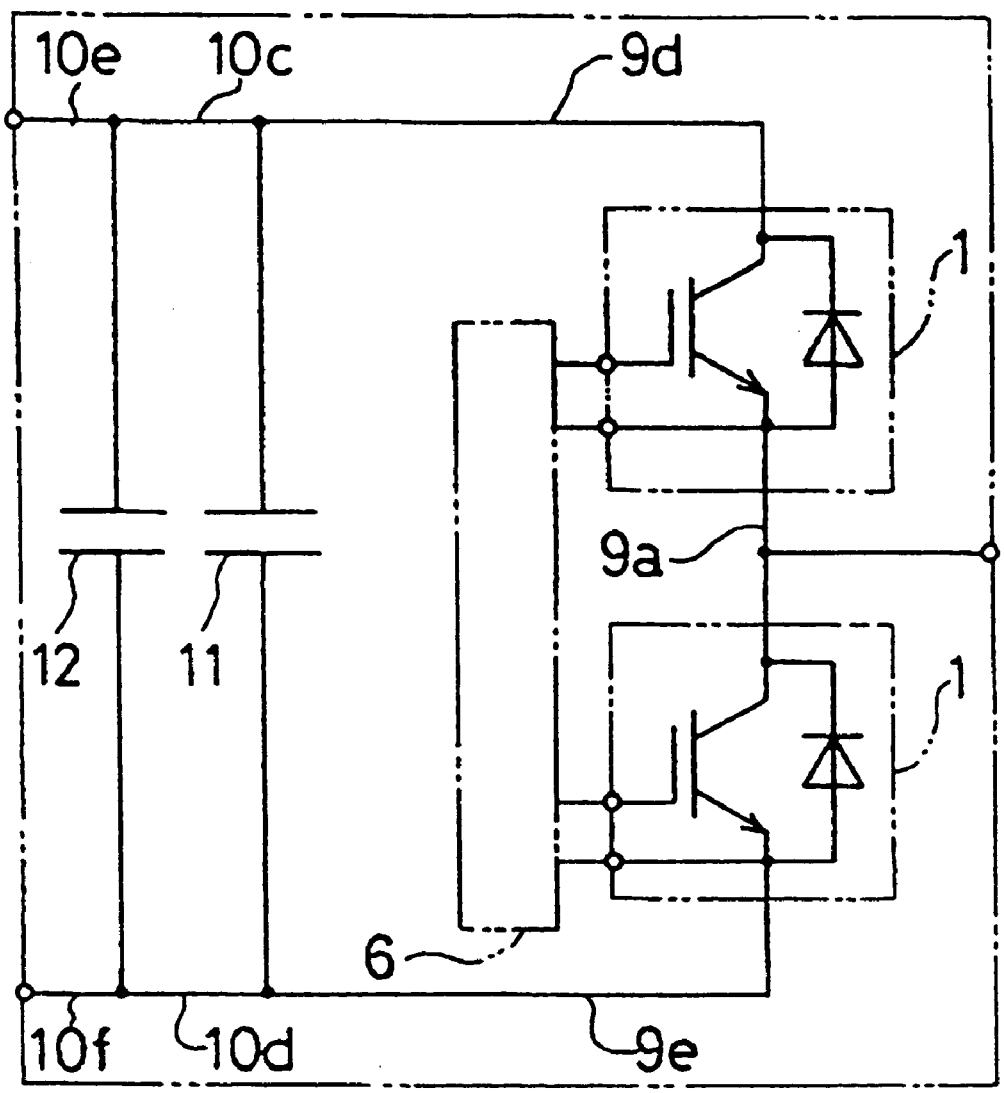
FIG. 3 is a circuit diagram of a semiconductor switching circuit in the second embodiment of the present invention.
Figure 4:
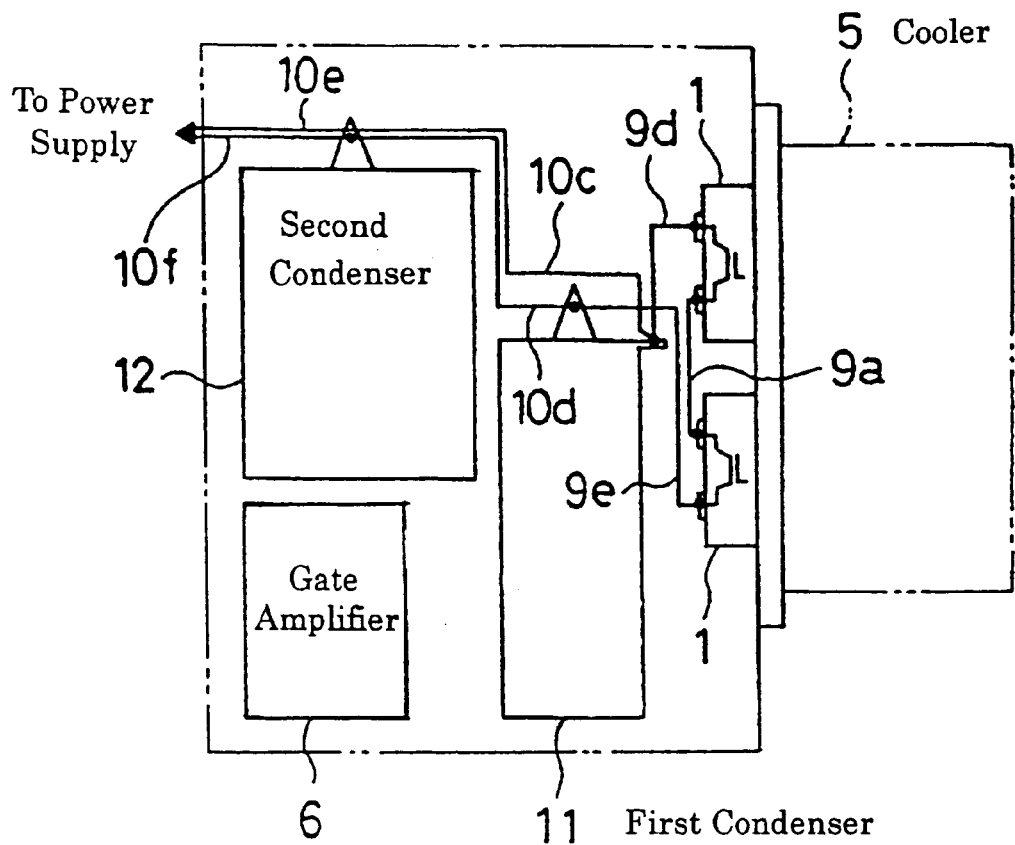
FIG. 4 is a block diagram showing the arrangement of parts in the above-mentioned embodiment.

A circuit diagram of one set of semiconductor switching circuits adopted in the power conversion system in the second embodiment of the present invention is shown in FIG. 3 and its block diagram is shown in FIG. 4. A first capacitor 11 for surge voltage absorbing and a second capacitor 12 as a filter capacitor are connected in parallel to both ends of two series-connected semiconductor devices 1. At the side close to the semiconductor devices 1, the first capacitor 11 is arranged and at the side far away from the semiconductor devices 1, the second capacitor 12 is arranged.

The second capacitor 12 uses a capacitor in the same capacity (about 1000 μF) as the filter capacitor 7 in a conventional system. Further, the capacity of the first capacitor 11 is below the capacity of the second capacitor 12, preferably about ⅒ (about 100 μF) of the second capacitor 12, downsized and also, using its capacitor case as one of the electrodes, its internal inductance is reduced to about 50 nH.

The first capacitor 11 and the semiconductor devices 1 are connected by conductors 9a, 9d, 9e. The conductors 9a, 9d, 9e are made short as could as possible and brought close each other so as to suppress the overall inductance to below 200 nH so that the inductance of this loop circuit becomes below 250 nH.

Further, as described above, it is possible to arrange both electrodes of the first capacitor 11 close to the intermediate connecting point of two series-connected semiconductor devices 1 and also, to arrange both electrodes of the first capacitor 11 close to both ends of two series-connected semiconductor devices 1 (these arrangements are also applicable to the embodiments shown below. Refer to, for instance, the structures shown in FIG. 19 and FIG. 20.)

The second capacitor 12 is arranged at the side farther away from the semiconductor devices 1 than the first capacitor 11 and the second capacitor 12 and the first capacitor 11 are connected by conductors 10c, 10d. The semiconductor devices 1, the first capacitor 11 and the second capacitor 12 are arranged hierarchically from a cooler 5 so as to make mutual connection of conductors easy. Further, two series-connected semiconductor devices 1 are arranged in parallel close to the cooler 5 as that the length of the conductor 9a between two semiconductor devices 1 becomes most short.

Two or three or multiple sets of semiconductor switching circuits in the construction are connected in parallel so as to construct a converter circuit or an inverter circuit likewise the first embodiment, and a switching command is input to respective semiconductor circuits from the gate amplifier 6 so that the semiconductor devices 1 make the switching operation to convert AC input to DC output (in case of the converter circuit) or DC power into AC output (in case of the inverter circuit).

In this case, likewise the first embodiment, as inductance of a loop circuit that is enclosed by the first capacitor 11 and the semiconductor devices 1 is 250 nH or below, surge voltage applied to both ends of the semiconductor devices 1 can be suppressed within the range of the rated voltage of the semiconductor device and the satisfactory switching operation can be made without breaking the system. Further, the second capacitor 12 uses a capacitor in the same capacity as the filter capacitor in a conventional system and serves as a filter capacity to stably feed supply voltage.

According to the power conversion system in the second embodiment, as the first capacitor 11 for surge voltage absorbing was separated from the second capacitor 12 that is a filter capacitor, there are such merits that it becomes possible to make the system in more small size and arrange it close to the semiconductor devices 1 and reduce inductance when installed. Further, as a snubber circuit that is a protective circuit around the semiconductor devices was eliminated, it becomes possible to reduce the number of parts and kinds sharply. In addition, as a snubber resistor was eliminated, heat loss can be reduced and coupled with reduction of the number of parts, simplified construction, it becomes possible to achieve the downsized light weighted and low priced system.

Third Embodiment

Figure 5:
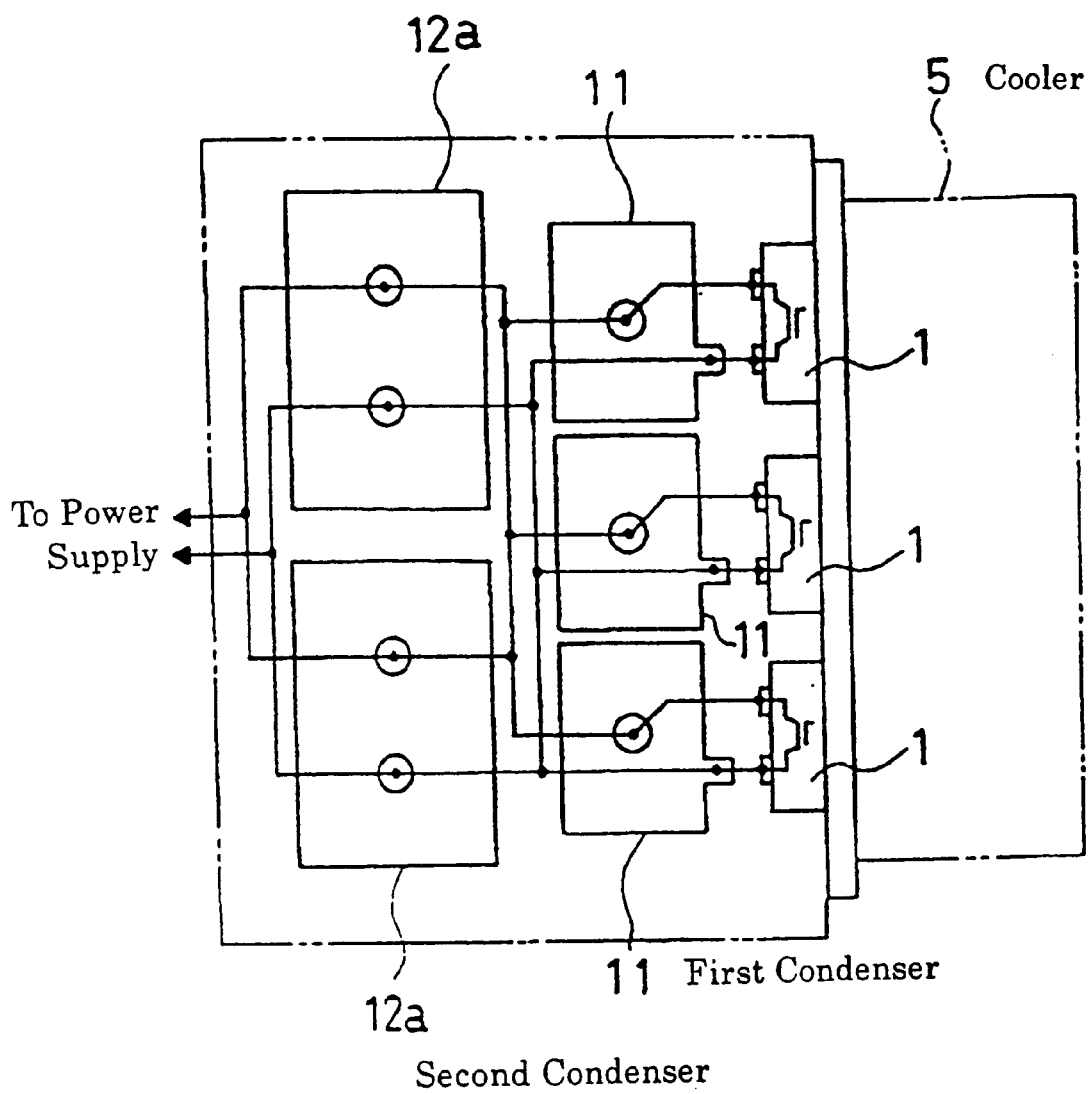
FIG. 5 is a block diagram showing the arrangement of parts of a power conversion system in the third embodiment of the present invention.

The construction of the power conversion system in the third embodiment of the present invention is shown in FIG. 5. The power conversion system in the third embodiment is an inverter circuit that is composed of 3 sets of the semiconductor device adopted in the second embodiment shown in FIG. 3 and FIG. 4 arranged in parallel. However, although it is possible to construct an inverter circuit by arranging 3 sets of the semiconductor switching circuit adopted in the second embodiment, in this power conversion system in the third embodiment, two units of the second capacitor 12a are provided for 3 sets of the semiconductor switching circuit.

The operation of this power conversion system in the third embodiment is the same as that of the power conversion system in the second embodiment. However, as the number of units of the second capacity 12a is reduced, the more number of parts and the price can be reduced accordingly.

Further, it is also possible to reduce the number of units of the second capacitor 12a to only one unit and in this case, there is such a merit that the configuration of conductors to connect the second capacitor to the first capacitor 11 can be more simplified.

Fourth Embodiment

Figure 6:
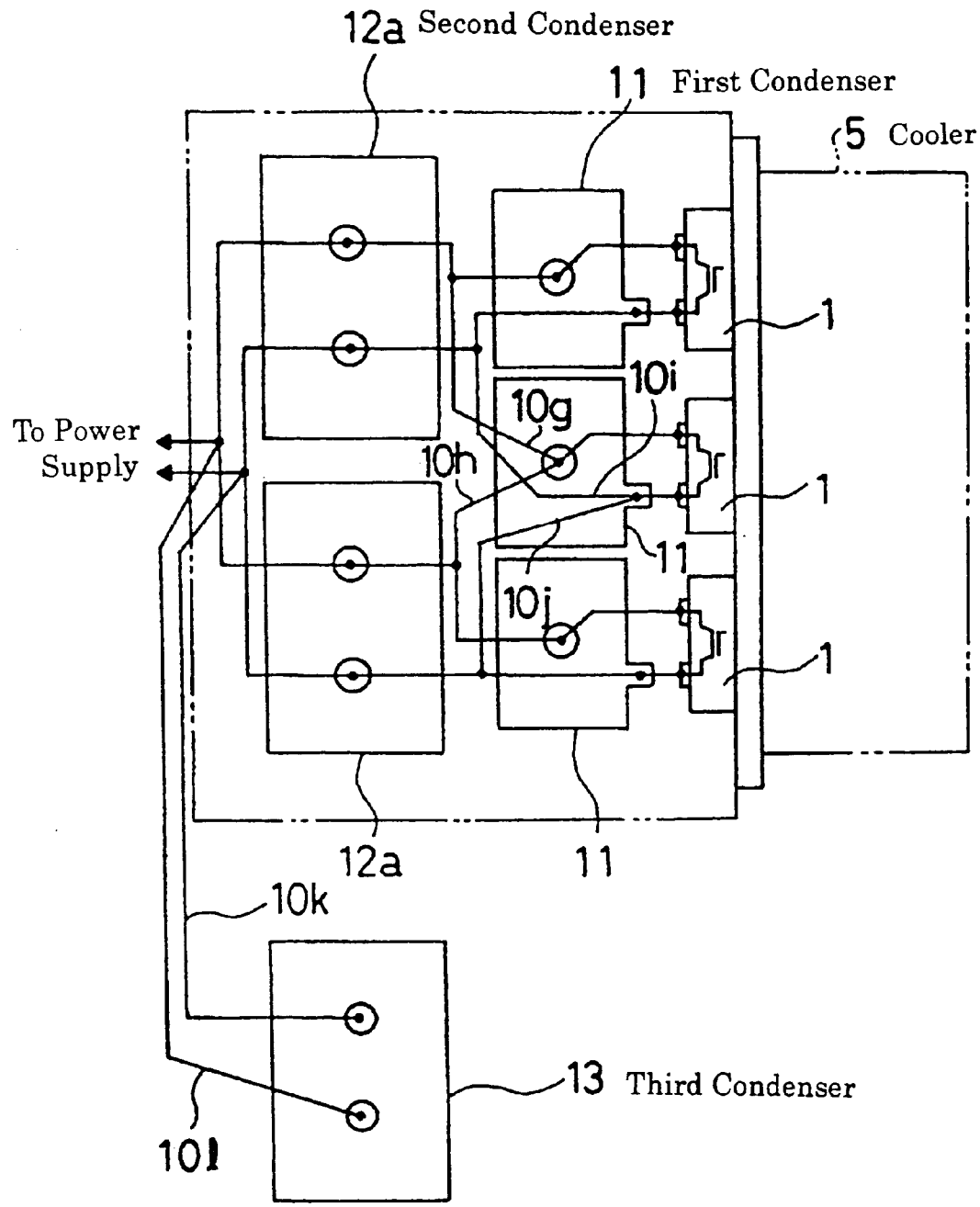
FIG. 6 is a block diagram showing the arrangement of parts of a power conversion system in the fourth embodiment of the present invention.

The construction of the power conversion system in the fourth embodiment of the present invention is shown in FIG. 6. The arrangement of the first capacitor 11 and the second capacitor 12a is the same as that of the power conversion system in the third embodiment. However, regarding the connections of capacitors by conductors in this fourth embodiment, two units of the second capacitors 12a are connected to the first capacitor 11 at the central position of three phases by conductors 10g, 10h, 10i, 10j and the second capacitor 12a only arranged at the side close to the first capacitor is connected to each of the first capacitors 11 arranged at both sides of three phases by conductors.

Further, in the power conversion system of the fourth embodiment, in addition to the second capacitors 12a that become the main elements of the filter capacitors provided in the main circuit unit, a third capacitor 13 that becomes an auxiliary element of the filter capacitors is arranged at the outside of the main circuit unit and connected to the main circuit unit by conductors 10k, 10l.

The filter capacitor is thus constructed by the second capacitors 12a in the main circuit unit and the external third capacitor 13, and when the capacity of the external third capacitor 13 is selected, it is possible to correspond the capacity of the filter capacitor to a filter constant required for the system without change a capacity constant of the capacitor of the main circuit and the main circuit unit can be made commonly usable.

Fifth Embodiment

Figure 7:
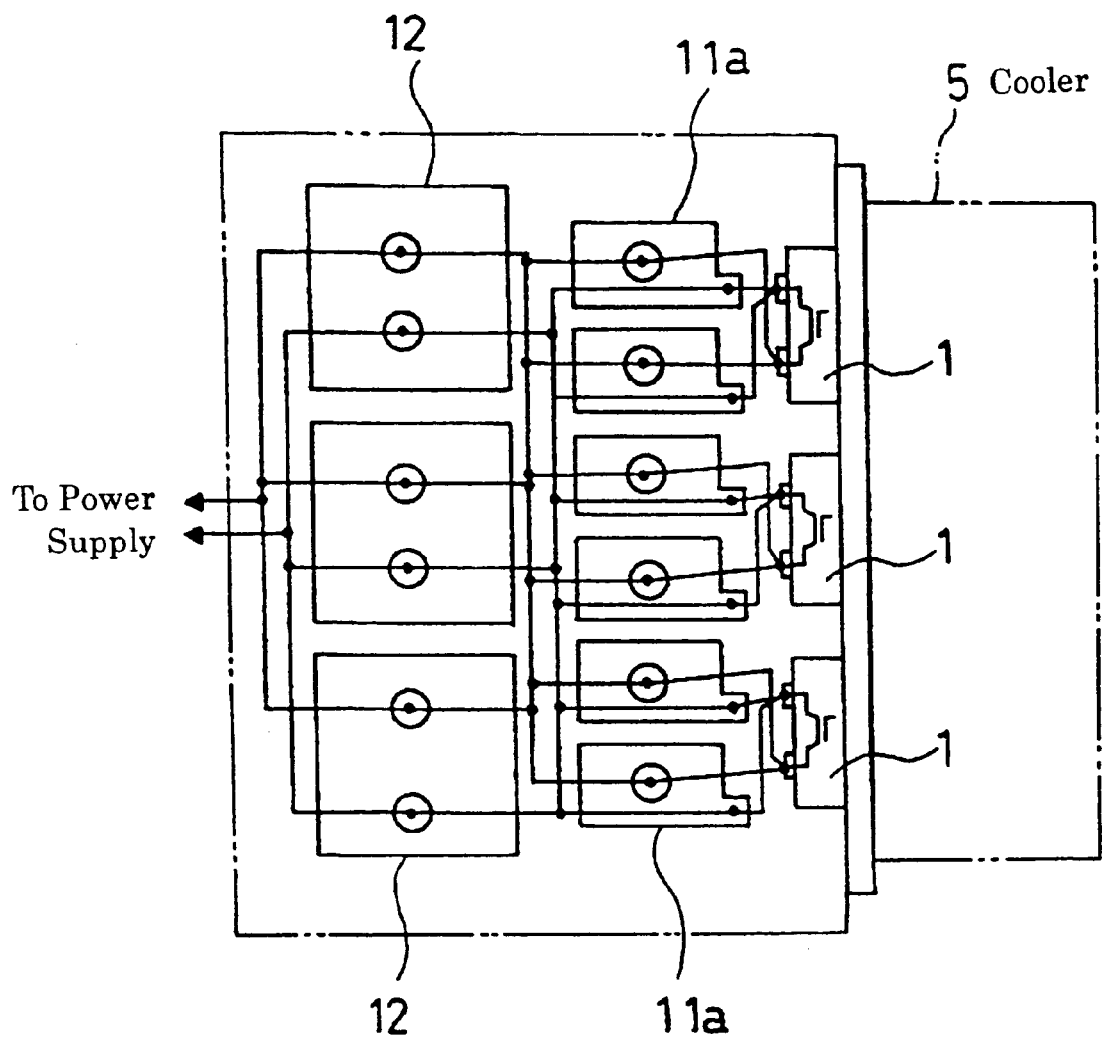
FIG. 7 is a block diagram showing the arrangement of parts of a power conversion system in the fifth embodiment of the present invention.

The construction of the power conversion system in the fifth embodiment of the present invention is shown in FIG. 7. In this power conversion system in the fifth embodiment, two units of the first capacitor 11a are connected in parallel to one phase of a semiconductor switching circuit comprising two series-connected semiconductor device 1. Further, the first capacitor 11a keeps one of its electrodes at a case potential and this case is connected with a minus side of the semiconductor switching circuit. One unit of the second capacitor 12 is arranged to each of the semiconductor switching circuit in each phase.

In this power conversion system in the fifth embodiment, each of the first capacitor 11a can be constructed in a small size by arranging two units of the first capacitor 11a in parallel by each phase and its internal inductance also can be reduced and furthermore, the overall inductance of the capacitor portion can be reduced by arranging two units in parallel with each other.

Further, as the cases of the first capacitors 11a are also used as minus electrodes, it becomes possible not only to downsize the capacitors and make inductance low but also to make an insulating distance with parts provided around the first capacitors 11a less and to make the system small in size and light in weight. Further, there is a merit from the viewpoint of safety if touched as the capacitors are normally at the same potential as the earth potential as the cases become the minus side potential.

In addition, the connection to the first capacitors 11 from the semiconductor devices 1 by conductors are two sets in parallel with each other and thus, it becomes easy to reduce inductance of the semiconductor switching circuit and a satisfactory switching operation is assured.

Sixth Embodiment

Figure 8:
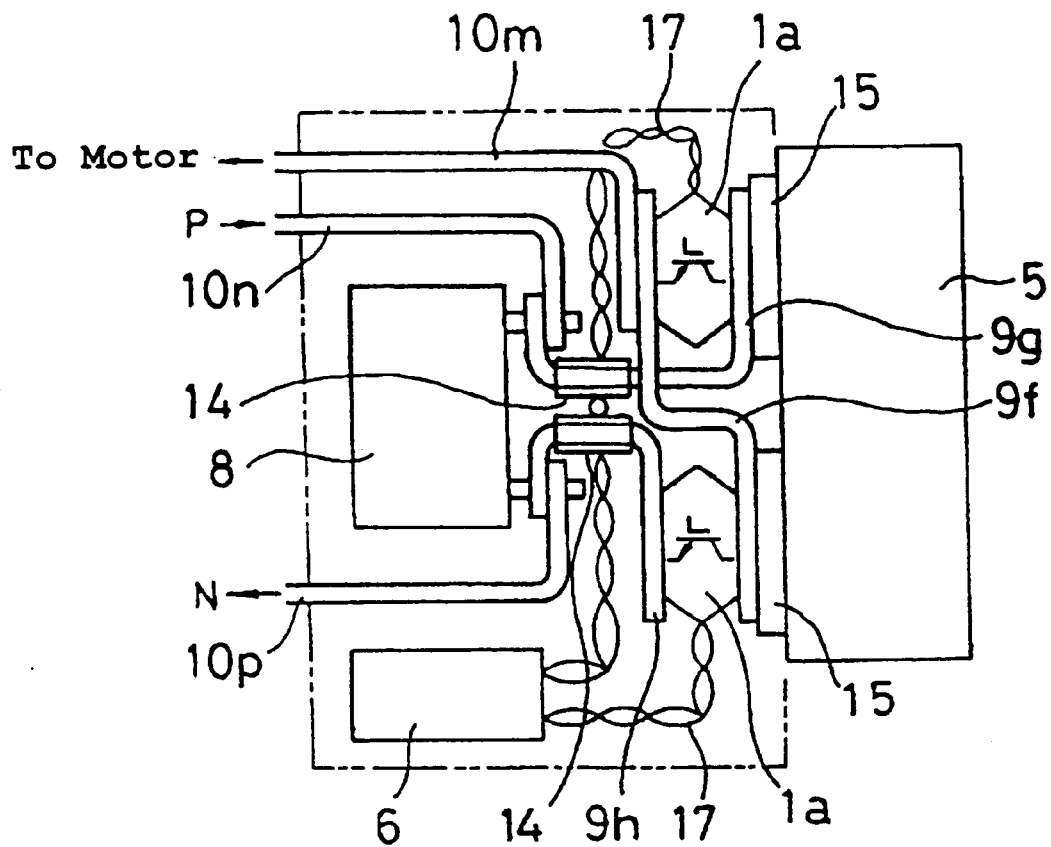
FIG. 8 is a side view showing the construction of a power conversion system in the sixth embodiment of the present invention.
Figure 9:
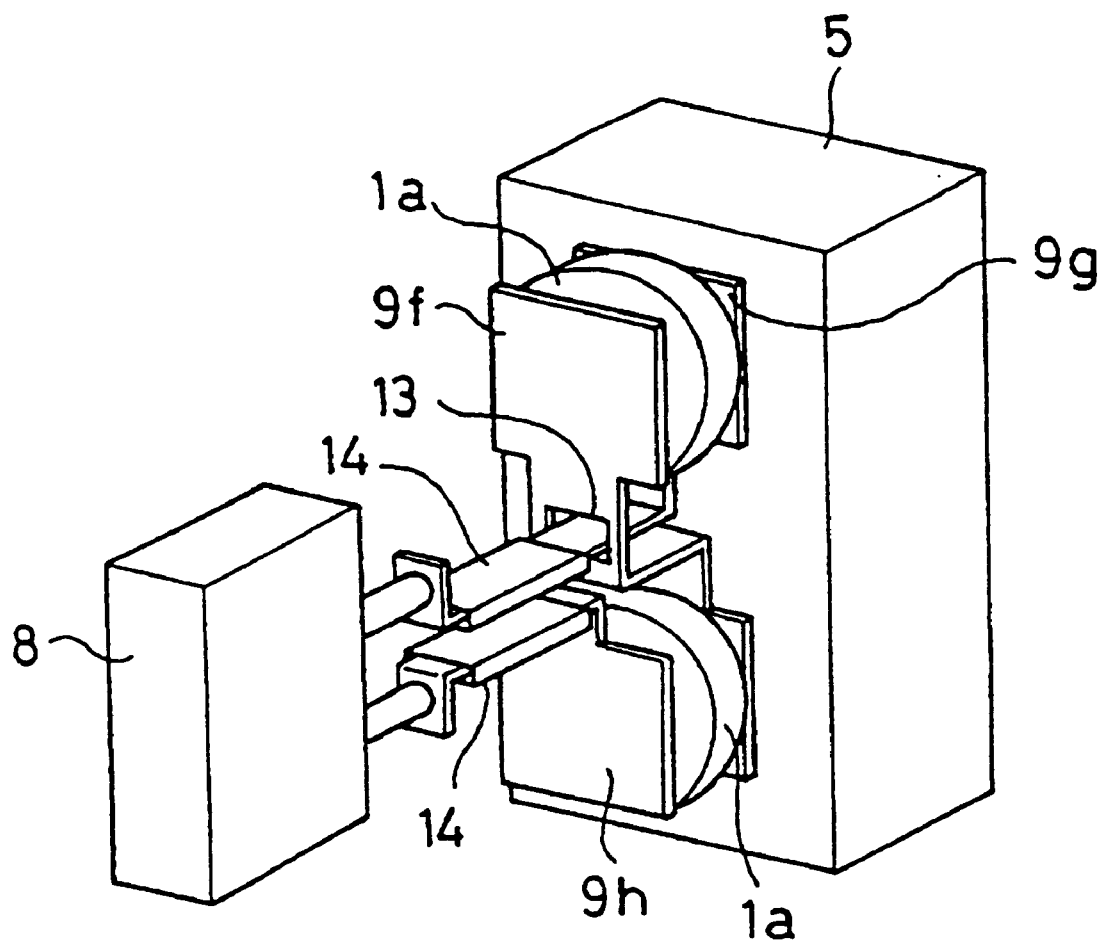
FIG. 9 is a perspective view showing the construction of the power conversion system in the above-mentioned embodiment.

Next, the power conversion system in the sixth embodiment of the present invention will be described based on FIG. 8 and FIG. 9. FIG. 8 and FIG. 9 show the construction of one set of semiconductor switching circuits adopted in the power conversion system in the sixth embodiment.

The power conversion system in the sixth embodiment is an inverter system and features in the construction wherein voltage driving high-frequency switching devices capable of switching at above continual 700 Hz like IGBT and IEGT, which are pressure fit semiconductor devices are adopted for two series-connected semiconductor devices 1a comprising the semiconductor switching circuit and pressure fitted to the semiconductor device cooler 5 and conductors 9f, 9g, 9h.

Two semiconductor devices 1a that are to be series connected are arranged in parallel with each other by facing the surface having small inner thermal resistance to the cooler 5 and pressure fitted to the cooler 5 with an insulating plate 15 made of such material as aluminum nitride that is excellent in electric insulation and has large thermal conductivity put between them. Further, the capacitor 8 that serves as a filter capacitor as well as a surge voltage absorbing capacitor, the cooler 5 and the semiconductor devices 1a are arranged hierarchically, the negative pole of the upper arm side semiconductor device 1a and the positive pole of the lower arm side semiconductor device 1a of each semiconductor switching circuit are electrically connected by the conductor 9f and the positive pole of the upper arm side semiconductor device 1a and the negative pole of the lower arm side semiconductor device 1a are electrically connected by one set of conductors 9g, 9h that are closed to both ends of the capacitor 8, respectively. The close one set of conductors 9g, 9h are electrically insulated by an insulator 14 provided at their closed portion.

Further, as an inverter, one end of a conductor 10m is connected to the conductor 9f that is an intermediate connecting point of the upper and lower arm semiconductor devices 1a and AC power is output to a motor and further, conductors 10n, 10p are connected to both ends of the capacitor 8 jointly with the conductors 9g, 9h in order to input DC power. Further, to compose a converter system, the conductor 10m is connected to one phase of the AC input and DC power is taken from the conductors 10n, 10p (This external connection is also applicable to the embodiments shown below).

In the power conversion system of the sixth embodiment, at the portions where the conductors 9f, 9g, 9h interfere because of pressure of the pressure fit semiconductor devices 1a to the cooler 5 and the electrical connection of the conductors 9f, 9g, 9h with the semiconductor devices 1a, a hole 13 is provided on one conductor 9f so as to penetrate the conductor 9g as shown in FIG. 9 and these cooler 5, conductors 9f, 9g, 9h and semiconductor devices 1a are fixed and electrically connected by strongly clamping them simultaneously in the shape of sandwiches by a pressing device (not shown) from the outside.

Thus, according to the power conversion system in the sixth embodiment, the semiconductor devices 1a are connected to the gate amplifier 6 by lead wires 17 and when a switching command is input, the semiconductor devices 1a make the switching operation. At this time, in order to make inductance of the capacitor 8 and the semiconductor devices 1a as small as possible, the capacitor 8 and the semiconductor devices 1a are brought close to each other and the conductors 9f, 9g, 9h are also made short and closely arranged. Thus, inductance of the loop circuit could be suppressed to below 250 nH and in case of semiconductor devices of rated voltage 3300V that are adopted in the main circuit for electric railway car driving, a satisfactory switching characteristic can be obtained without causing the breaking by suppressing surge voltage Vp to below 3000V without a snubber circuit. As a result, a snubber circuit as a protective circuit around the semiconductor devices is eliminated and the number of parts and kinds can be reduced sharply and also, in order to eliminate a snubber resistor, thermal loss can be reduced and coupled with reduction of the number of parts and kinds, simplified configuration, it is possible to achieve a small sized, light weighted and low priced system.

Further, in the sixth embodiment, the hole 13 is opened on the conductor 9f and the interfering portion of the conductor 9g is penetrated through this hole. However, instead of this, it is possible to avoid the interference with the conductor 9g by bending the interfering portion of the conductor 9f in the C-shape or notching it. Further, it is also possible to prevent the generation of the interference by shifting the conductor 9f laterally from the conductors 9g, 9h and the arrangement and shape of the conductors are not especially restricted.

Seventh Embodiment

Figure 10:
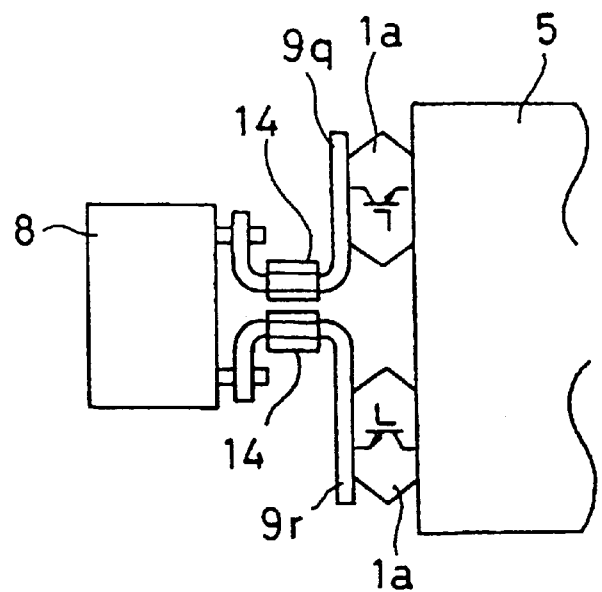
FIG. 10 is a side view showing the construction of a power conversion system in the seventh embodiment of the present invention.

Next, the power conversion system in the seventh embodiment of the present invention will be described based on FIG. 10. FIG. 10 shows the construction of one set of semiconductor switching circuits that are adopted in the power conversion system in the seventh embodiment. This seventh embodiment features that the same pressure fit semiconductor devices 1a as those in the sixth embodiment are adopted and the semiconductor device cooler 5 is used as an intermediate connecting conductor of the upper and lower arm semiconductor devices.

In other words, two semiconductor devices 1a, that are to be series connected and comprise the semiconductor switching circuit, are arranged laterally and opposing each other and the negative pole side of the upper arm side semiconductor device 1a and the positive pole side of the lower arm side semiconductor device 1a are press fitted to the same plane of the cooler 5. Further, the filter capacitor 8 which also serves absorbing the surge voltage, the cooler 5 and the semiconductor devices 1a are arranged hierarchically, and the positive pole of the upper arm side semiconductor device 1a and the negative pole of the lower arm side semiconductor device 1a are electrically connected to both terminals of the capacitor 8 by one set of closed conductors 9q, 9r. The same insulator 14 as that in the sixth embodiment is provided at the close portion of this one set of conductors 9q, 9r for electrical insulation.

Further, a conductor (not shown) is connected to the cooler 5 at the intermediate connecting point of the upper and lower arm semiconductor devices 1a and is led out to the outside as the main circuit input point (in case of a converter circuit) or the main circuit output point (in case of an inverter circuit) and further, likewise the sixth embodiment, this conductor is connected together with the conductors 9q, 9r to both terminals of the capacitor 8 and leads out to the outside as the main circuit output point (In case of a converter circuit) or the main circuit input point (in case of an inverter circuit).

In the power conversion system in this seven embodiment, because of the pressure of the press fitting semiconductor devices 1a to the cooler 5 and the electrical connection of the conductors 9q, 9r to the semiconductor devices 1a, the parts are fixed and electrically connected by strongly clamping these cooler 5, conductors 9q, 9r and semiconductor devices 1a simultaneously from the outside by the pressing device (not shown) in the shape of sandwiches.

Thus, according to the power conversion system in the seventh embodiment, likewise the six embodiment, as the capacitor 8 and the semiconductor devices 1a are brought close to each other, the cooler 5 is used as an intermediate connecting conductor and the conductors 9q, 9r are made short to bring them close to each other so as to minimize inductance of the capacitor 8 and the semiconductor devices 1a as could as possible, inductance of the loop shape circuit can be suppressed to below 250 nH and the same effect as that of the sixth embodiment is achieved.

Moreover, in case of this seventh embodiment, the number of conductors can be reduced less than the sixth embodiment and the lengths also can be made short, if this embodiment is adopted to the power conversion system that is used under the environment wherein no electric shock measure is especially required for the cooler 5, it becomes possible to further reduce the number of parts, simplify the construction and reduce price.

Eighth Embodiment

Figure 11:
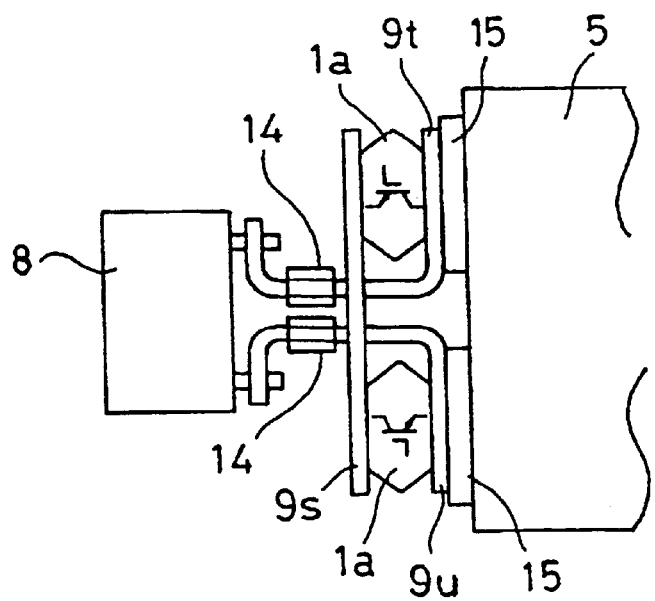
FIG. 11 is a side view showing the construction of a power conversion system in the eighth embodiment of the present invention.

Next, the power conversion system in the eight embodiment of the present invention will be described based on FIG. 11. FIG. 11 shows the construction of one set of semiconductor switching circuits that are adopted in the eighth embodiment. In the power conversion system in this eighth embodiment, pressure fit semiconductor devices similar to those in the sixth embodiment are adopted for two series-connected semiconductor devices 1a, and by facing the positive pole side of the upper arm side semiconductor device 1a and the negative pole side of the lower arm side semiconductor device 1a to the cooler 5, the semiconductor devices 1a are press fitted to the cooler 5 by putting an insulating plate 15 made of aluminum nitride that is excellent in electric insulation and has a large thermal conductivity between them. Further, the capacitor 8 that serves as a filter capacitor and absorbs surge voltage, the cooler 5 and the semiconductor devices 1a are arranged hierarchically, the negative pole of the upper arm side semiconductor device 1a and the positive pole of the lower arm side semiconductor device 1a are electrically connected by a conductor 9s and the positive pole of the upper arm side semiconductor device 1a and the negative pole of the lower arm side semiconductor device 1a are electrically connected to both terminals of the capacitor 8 by one set of conductors 9t, 9u that are close to each other. This one set of conductors 9t, 9u is electrically insulated by providing the insulator 14 at their close portion.

Further, a conductor (not shown) is connected to an intermediate connecting point that is the conductor 9s connecting between the upper and lower arm semiconductor devices 1a and led out to the outside as the main circuit input point (in case of a converter circuit) or the main circuit output point (in case of an inverter circuit) and further, likewise the sixth and seventh embodiments, a conductor is connected jointly with the conductors 9t, 9u to both terminals of the capacitor 8 and led out to the outside as the main circuit output point (in case of a converter circuit) or the main circuit input point (in case of an inverter circuit).

Even in the power conversion system in this eighth embodiment, because of the pressure of the pressure fit semiconductor devices 1a to the cooler 5 and the electrical connection of the conductors 9s, 9t, 9u to the semiconductor devices 1a, parts are fixed and electrically connected by strongly clamping these cooler 5, conductors 9s, 9t, 9u and semiconductor devices 1a in the shape of sandwiches simultaneously from the outside by a pressing device (not shown).

Thus, according to the power conversion system in the eighth embodiment, likewise the sixth and seventh embodiments, as the capacitor 8 and the semiconductor devices 1a are brought to close each other and the conductors 9s, 9t, 9u are also made short in length to the mutually closed shape and arrangement in order to minimize inductance of the capacitor 8 and the semiconductors 1a as could as possible, inductance of the loop shape circuit can be suppressed to below 250 nH and the same effect as that of the sixth embodiment is achieved.

Moreover, in case of this eighth embodiment, likewise the seventh embodiment, as the conductors can be made in a simple shape with less bent portions and the length also can be made short, it becomes possible to further reduce the number of parts, simplify the construction and reduce a price and further, as the cooler 5 is insulated, likewise the sixth embodiment, it is possible to expose at least the radiating portion of the cooler to the outside, thus improving the cooling effect.

Further, in the power conversion system of this eighth embodiment, because of the pressure of the pressure fit semiconductor devices 1a and the electrical connection of the conductors 9s, 9t, 9u to the semiconductor devices 1a, likewise the construction shown in FIG. 9 as the sixth embodiment, the hole 13 is provided on the conductor 9s at the portion where these conductors interfere to penetrate the conductors 9t, 9u or the interfering portion of the conductor 9s is bent in the C-shape or notched so as to avoid the interference with the conductors 9t, 9u. Further, it is also possible to prevent the generation of the interference by shifting the conductor 9s laterally from the conductors 9t, 9u and the arrangement and shape of the conductors are not especially restricted.

Further, it is also possible to construct the power conversion system in the eighth embodiment in such structure that two semiconductor devices 1a that are to be connected in series in the eighth embodiment are turned over completely as in the seventh embodiment shown in FIG. 10, an insulating plate that is excellent in insulation and has a large thermal conductivity like aluminum nitride is put between the cooler 5 and the semiconductor devices 1a, the negative pole of the upper arm side semiconductor device 1a and the positive pole of the lower arm side semiconductor device 1a facing the cooler are connected by the conductor 9s and the positive pole of the upper arm side semiconductor device 1a and the negative pole of the lower arm side semiconductor device 1a are connected to both terminals of the capacitor 8 by the same conductor in the seventh embodiment shown in FIG. 10. In this case, no interference is produced between the conductors and therefore, the shapes of the conductors in the eighth embodiment can be made simple and the manufacturing and assembling become easy.

Ninth Embodiment

Figure 12:
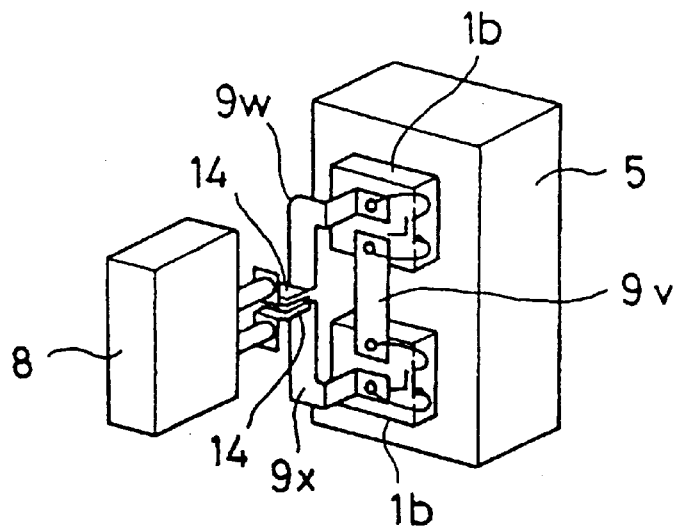
FIG. 12 is a side view showing the construction of a power conversion system in the ninth embodiment of the present invention.
Figure 13:
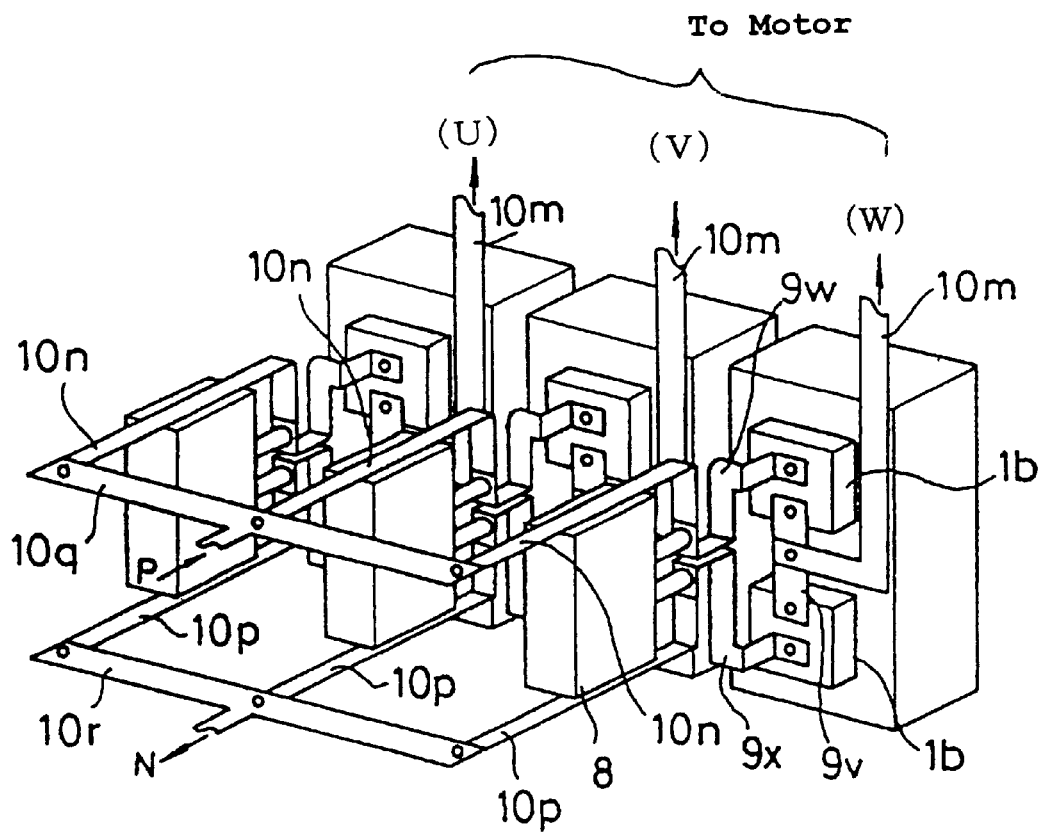
FIG. 13 is a perspective view showing an inverter circuit assembled using the power conversion system in the above-mentioned embodiment.

Next, the power conversion system in the ninth embodiment will be described based on FIG. 12 and FIG. 13. FIG. 12 shows the construction of one set of semiconductor switching circuit that is adopted in the power conversion system in the ninth embodiment and FIG. 13 shows the construction of an inverter circuit that is constructed by assembling 3 sets of the semiconductor switching circuit in parallel. As shown in FIG. 12, the power conversion system in the ninth embodiment uses a nearly rectangular shaped modular semiconductor device for the semiconductor device 1b. This modular semiconductor device 1b is in such structure that positive and negative terminals are provided on one surface and the other surface is a flat cooling and mounting surface for mounting to the mounting board by bolts and nuts (not shown). The electrical characteristic of this modular semiconductor device 1b is the same as that of the pressure fit semiconductor device adopted in the above-mentioned embodiments and its operating characteristic is also equivalent to that of the pressure fit semiconductor device.

Two semiconductor devices 1b that are to be connected in series for constructing semiconductor switching circuits are mounted on the same plane of the semiconductor device cooler 5 close each other and laterally so that the cooling and mounting surface is press fitted thereto. The upper and lower arm semiconductor devices 1b face in the same direction, the positive terminal and negative terminals are positioned at the upper and lower sides, respectively in FIG. 12, the negative pole terminal of the upper arm side semiconductor device 1b and the positive pole terminal of the lower side semiconductor device 1b which are near each other are electrically connected by a conductor 9v and further, the positive pole terminal of the upper arm side semiconductor device 1b and the negative pole terminal of the lower arm side devices 1b are electrically connected to both terminal of the capacitor 8 by one set of conductors 9w, 9x that are close to each other. One set of these conductors 9w, 9x are electrically insulated by providing the insulator 14 at their close portion.

3 sets of the semiconductor switching circuit thus assembled in the construction shown in FIG. 12 is provided in parallel as shown in FIG. 13, U, V, W phase output conductors 10m for a three-phase AC motor are connected to the conductors 9v of these switching circuits, DC input conductors 10n, 10p are connected to both terminals of the capacitors 8 of these 3 set of the switching circuits jointly with the conductors 9w, 9x and an inverter circuit is composed by connecting these 3 sets of DC input conductors 10n, 10p by common conductors 10q, 10r. Further, on the contrary, it is possible to compose a converter circuit by connecting the U, V, W phase input conductors to the conductors 9v of 3 sets of the semiconductor switching circuits and using the conductors 10q, 10r commonly connecting 3 sets of the conductors 10n, 10p as DC output conductors.

In the power conversion system in this ninth embodiment, when the positive pole P and the negative pole N of the DC input power source are connected to the conductors 10q, 10r and the output conductor 10m is connected to the U, V, W phase terminals of the 3-phase terminals of an AC motor, this power conversion system operates as an inverter circuit and drives the motor by converting DC power into 3-phase AC.

According to the power conversion system in the ninth embodiment in the above-mentioned construction, likewise the sixth embodiment, as the capacitor 8 and the semiconductor devices 1b are brought to close each other and the length of conductors 9v, 9w, 9x are made short and arranged in order to minimize inductance of the capacitor 8 and the semiconductor devices 1b as could as possible, inductance of the loop circuit can be reduced to below 250 nH and in case of semiconductor devices of rated voltage 3300V that are adopted in a main circuit for electric railway cars, good switching characteristic can be obtained without breaking by voltage by suppressing surge voltage Vp to below 3000V without a snubber circuit. As a result of the elimination of a snubber circuit as a protective circuit around semiconductor devices, it is possible to sharply reduce the number of parts and kinds and further, in order to eliminate a snubber resistor, reduce thermal loss and coupled with reduction of number of parts and kinds and simplified construction, it becomes possible to realize a small sized, light weighted and cheap price power conversion system.

In the ninth embodiment, as modular type semiconductor devices are adopted and the mounting surface sides of these devices are mounted to the cooler, it is not needed to provide an insulating plate between the semiconductor device and the cooler for insulation of the cooler likewise pressure fit semiconductor devices and it becomes possible to reduce the number of parts on that point.

Further, in the ninth embodiment, the conductors 9w, 9x are bent to shift them from the conductor 9v laterally so as to avoid the interfere. However, a measure to avoid the interference is not restricted to this and any one of measures enumerated in the explanation of the sixth embodiment can be adopted.

Tenth Embodiment

Figure 14:
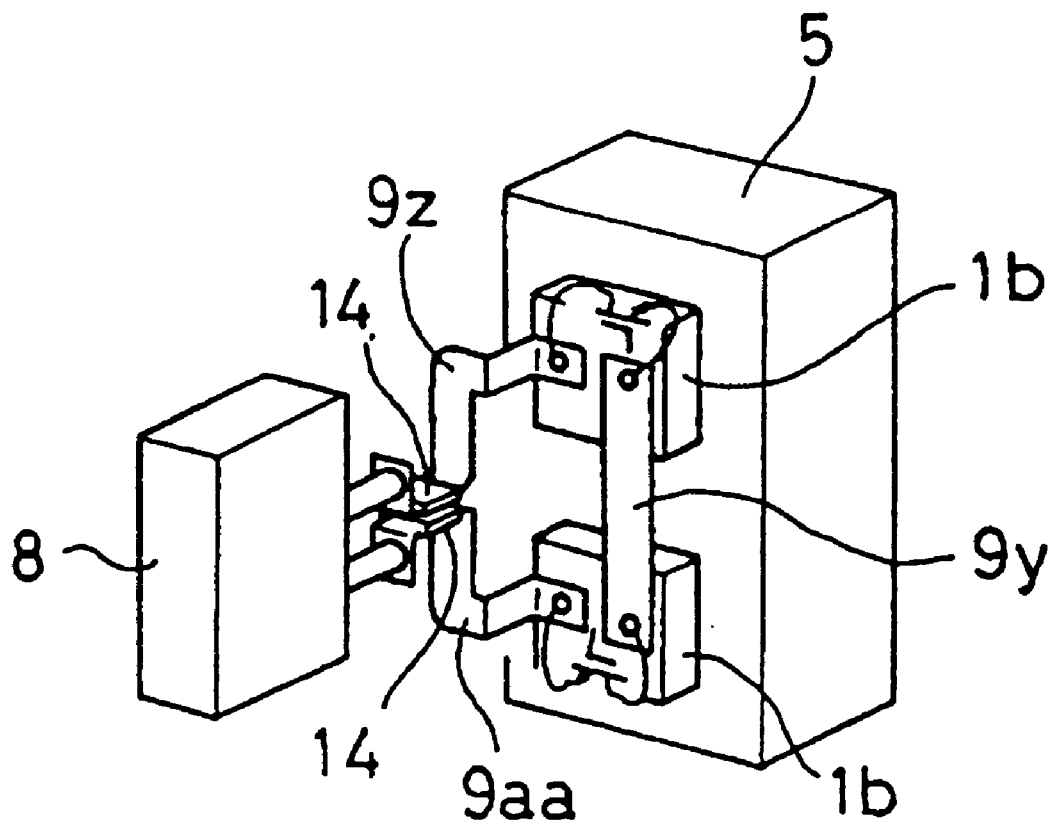
FIG. 14 is a perspective view showing the construction of a power conversion system in the tenth embodiment of the present invention.

Next, the power conversion system in the tenth embodiment of the present invention will be described based on FIG. 14. FIG. 14 shows the construction of one set of semiconductor switching circuits adopted in the tenth embodiment. The tenth embodiment features that the arrangement of modular type semiconductor devices 1b in the ninth embodiment shown in FIG. 12 is somewhat changed. That is, as shown in FIG. 14, the upper arm side semiconductor device 1b of two semiconductor devices 1b that are to be connected in series and comprise the semiconductor switching circuit is so arranged that its positive pole terminal comes to the left side and the negative pole terminal comes to the right side, and the lower arm side semiconductor device 1b is so arranged that its positive pole terminal comes to the right side and the negative pole terminal comes to the left side, the negative pole terminal of the upper arm side semiconductor device 1b and the positive pole terminal of the lower arm side semiconductor device 1b are electrically connected by a conductor 9y and further, the positive pole terminal of the upper arm side semiconductor device 1b and the negative pole terminal of the lower arm side semiconductor device 1b are electrically connected to both terminals of the capacitor 8 by one set of close conductors 9z, 9aa. This one set of conductors 9z, 9aa is electrically insulated by providing the insulator 14 to the near portion of these conductors.

It is possible to construct an inverter circuit when 3 sets of the thus assembled semiconductor switching circuit are arranged as shown in FIG. 13 likewise the ninth embodiment, U-, V- and W-phase output conductors corresponding to a 3-phase AC motor are connected to the conductors 9y of these switching circuits and a DC input conductor is connected jointly with the conductors 9z, 9aa to both terminals of the capacitor 8 of each of 3 sets of the semiconductor switching circuit. On the contrary, it is possible to construct a converter circuit when the U-, V- and W-phase input conductors of 3-phase AC power source are connected to the conductor 9y of the semiconductor switching circuit of each of 3 sets and a DC output conductor is connected commonly to the conductors 9z, 9aa of 3 sets of the semiconductor switching circuit.

The power conversion system in this tenth embodiment has the same effects as those in the ninth embodiment and it is possible to construct a power conversion portion without a snubber circuit, reduce the number of parts and kinds, and achieve a small and light weighted system.

Eleventh Embodiment

Figure 15:
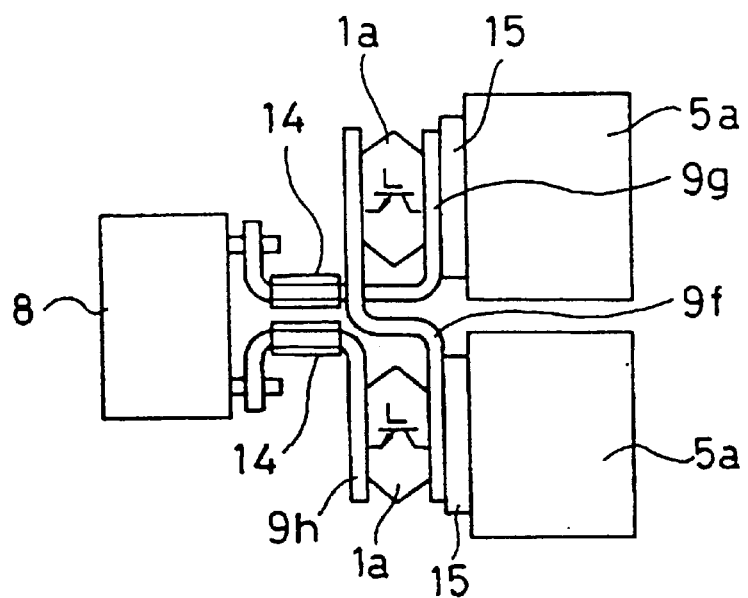
FIG. 15 is a side view showing the construction of a power conversion system in the eleventh embodiment of the present invention.

Next, the power conversion system in the eleventh embodiment of the present invention will be described based on FIG. 15. The power conversion system in the eleventh embodiment features that the semiconductor device cooler is made a split structure. That is, two semiconductor device coolers 5a are separately provided to cool each of two series-connected semiconductor devices 1a comprising the semiconductor switching circuits as shown in FIG. 15. Other component elements are the same as those in the sixth embodiment shown in FIG. 8 and FIG. 9 and therefore, the detailed explanation of the construction is omitted.

According to the power conversion system of this eleventh embodiment, as the semiconductor device cooler 5a is provided to every semiconductor device 1a, the temperature rise of a cooler by heat generation of one of the semiconductor does not affect the other cooler for cooling the other semiconductor device and the efficient radiation becomes possible.

Further, the construction of the cooler 5a in the split structure is applicable equally to any of the seventh through tenth embodiments for efficiently cooling the semiconductor devices 1a or 1b.

Twelfth Embodiment

Figure 16:
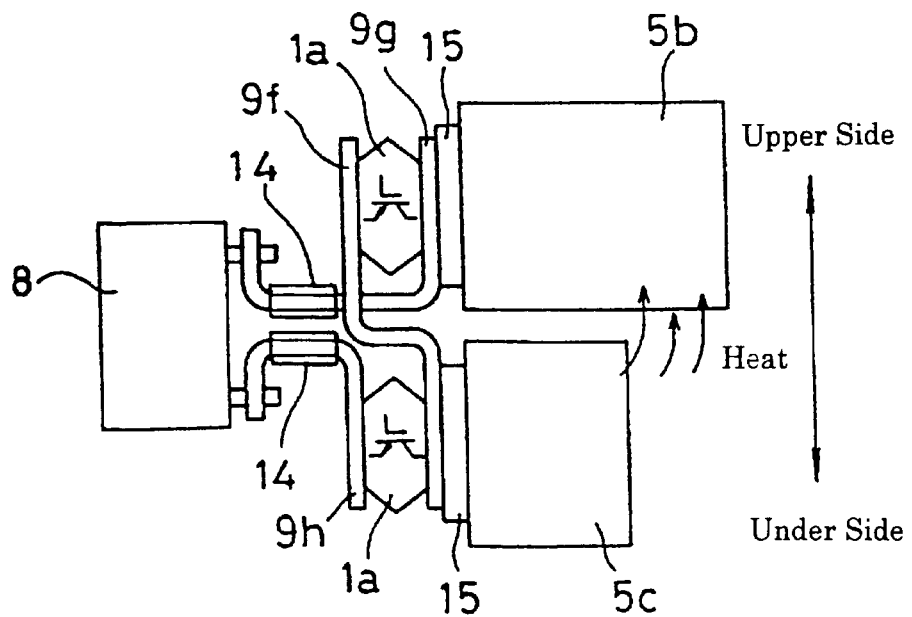
FIG. 16 is a side view showing the construction of a power conversion system in the twelfth embodiment of the present invention.

Next, the power conversion system in the twelfth embodiment of the present invention will be describe based on FIG. 16. The twelfth embodiment features that not only the cooler is made in such structure as to cool each of the semiconductor devices 1a individually as in the eleventh embodiment shown in FIG. 15 but also the upper side cooler 5b for the upper arm side semiconductor device 1a is provided with a larger radiation area than that of the lower side cooler 5c for the lower arm side semiconductor device 1a in order to make the radiating area of a cooler at the side where it is subject to heat radiated by a mating cooler and its temperature rises. Other component elements are the same as those in the sixth embodiment shown in FIG. 8 and FIG. 9 and the detailed explanation of the construction is omitted.

According to the power conversion system in this twelfth embodiment, as the semiconductor device cooler is split into 5b and 5c for each of the semiconductor devices 1a, the temperature rise of the cooler by the heat generation of the other semiconductor device does not affect the cooler for cooling the other semiconductor device and the efficient radiation becomes possible and furthermore, as the radiation area of the upper side cooler 5b that becomes the downstream side of the flow of heat is made larger than that of the lower side cooler 5c, the drop of cooling efficiency of the upper side cooler 5b that is also subject to heat from the mating cooler 5c jointly with the semiconductor device 1a can be suppressed to the minimum.

Further, even in this twelfth embodiment, the construction of the semiconductor device cooler split into the coolers 5b and 5c in different radiation areas is equally applicable to any of the above-mentioned seventh through tenth embodiments in order to efficiently cool the semiconductor devices 1a or 1b.

Thirteenth Embodiment

Figure 17:
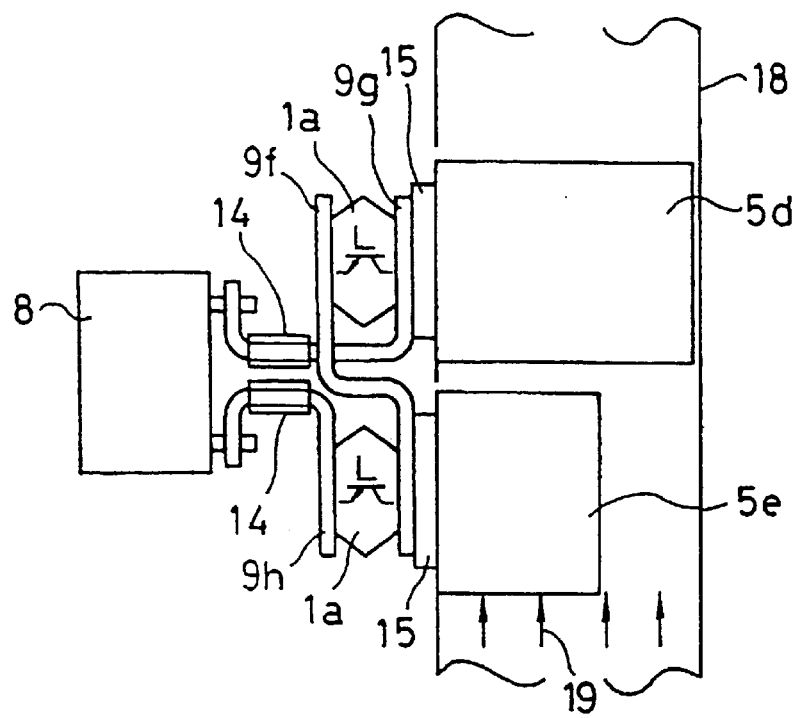
FIG. 17 is a side view showing the construction of a power conversion system in the thirteenth embodiment of the present invention.

Next, the power conversion system in the thirteenth embodiment of the present invention will be described based on FIG. 17. The power conversion system in the thirteenth embodiment features that the semiconductor device cooler is split into two units in different radiation area shown by the reference numerals 5d, 5e and housed in an air duct 18. That is, the radiation area of the cooler 5d at the downstream side position in the flow of cooling wind 19 flowing in the air duct 18 is made larger than that of the cooler 5e at the upper stream side position as shown in FIG. 17. Other component elements are the same as those in the sixth embodiment shown in FIG. 8 and FIG. 9 and the detailed explanation of the construction is omitted.

According to the power conversion system in this thirteenth embodiment, as the semiconductor device cooler is split into two units 5d and 5e for each semiconductor device 1a, the temperature rise of the cooler by the heat generation of one semiconductor device does not affect the other cooler for cooling the other semiconductor device and the efficient radiation becomes possible and as the radiation area of the cooler 5d at the downstream side position of the flow of the cooling wind 19 in the air duct 18 is made larger than that of the cooler 5e at the upper stream side position, the drop in cooling efficiency of the downstream side cooler 5d subject to the heat from the mating cooler 5e jointly with the semiconductor device 1a can be suppressed to the minimum.

Further, even in this thirteenth embodiment, the construction of the semiconductor device cooler split into the coolers 5d and 5e in different radiation areas housed in the air duct 18 is equally applicable to any of the above-mentioned seventh through tenth embodiments in order to efficiently cool the semiconductor devices 1a or 1b.

Fourteenth Embodiment

Figure 18:
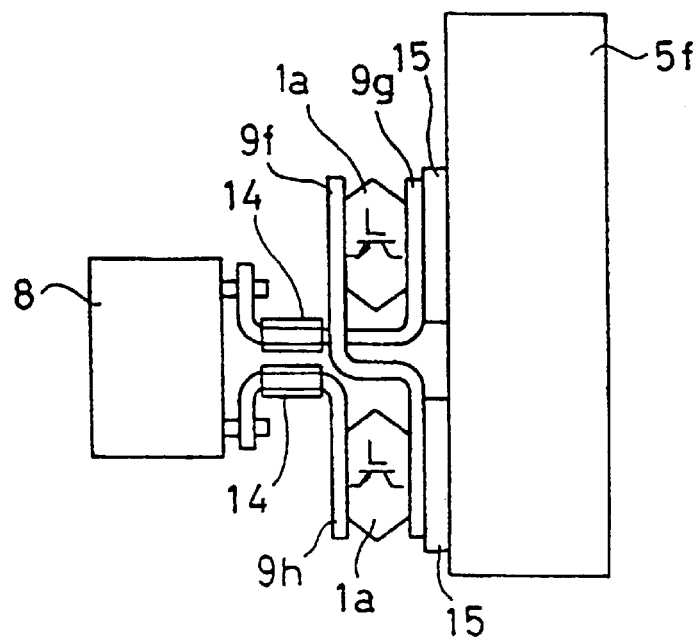
FIG. 18 is a side view showing the construction of a power conversion system in the fourteenth embodiment of the present invention.

Next, the power conversion system in the fourteenth embodiment of the present invention will be described based on FIG. 18. The fourteenth embodiment features that a single unit of the cooler 5f is used for the upper and lower semiconductor devices 1a of each switching circuit without splitting it into two units and the mounting positions of the upper and lower semiconductor devices 1a against the cooler 5f are shifted to the upper stream side of the flow of heat (the lower side in FIG. 18) from the upper and lower symmetrical positions. Other component elements are the same as those in the sixth embodiment shown in FIG. 8 and FIG. 9 and the detailed explanation of the construction is omitted.

According to the power conversion system in this fourteenth embodiment, the semiconductor device 1a located at the downstream side of the flow of heat (the upper side in FIG. 18) is subject to the heat radiated from the radiating portion (not shown) of the cooler 5f and its cooling efficiency drops; however, when the mounting position of the semiconductor device 1a located at the downstream side of the flow of heat is shifted to the upper stream side of the flow of heat, the radiating area of the cooler corresponding to the semiconductor device 1a located at the downstream side of the flow of heat becomes large and the drop of cooling efficiency can be suppressed to the minimum.

Further, as in the fourteenth embodiment the construction wherein the radiating areas of one cooler 5f corresponding to the upper and lower semiconductor devices 1a differ is equally applicable to any of the seventh tenth embodiments for efficiently cooling the semiconductors 1a or 1b.

Further, when the cooler 5f is housed in the air duct 18 as in the thirteenth embodiment shown in FIG. 17, it becomes possible to efficiently cool the semiconductor devices 1a similarly when the mounting positions of the upper and lower semiconductor devices 1a are shifted to the windward side of a cooling wind 19.

Fifteenth Embodiment

The construction of the power conversion system in the fifteenth embodiment of the present invention will be described based on FIG. 19. This power conversion system adopted pressure fit semiconductor devices 1a similar to those in the eleventh embodiment shown in FIG. 8 and FIG. 9 and the cooler 5 that is in the thickness equal to these semiconductor devices 1a and equipped with a good conductive heat collecting block portion 50 and a radiating portion 51 to radiate heat to the open air. For instance, if the cooler 5 is a heat pipe cooler to transport heat by utilizing phase change of refrigerant, this heat collecting block portion 50 radiates heat by circulating refrigerant in the radiating portion 51 utilizing a cooling block filled with refrigerant for boiling.

Figure 19:
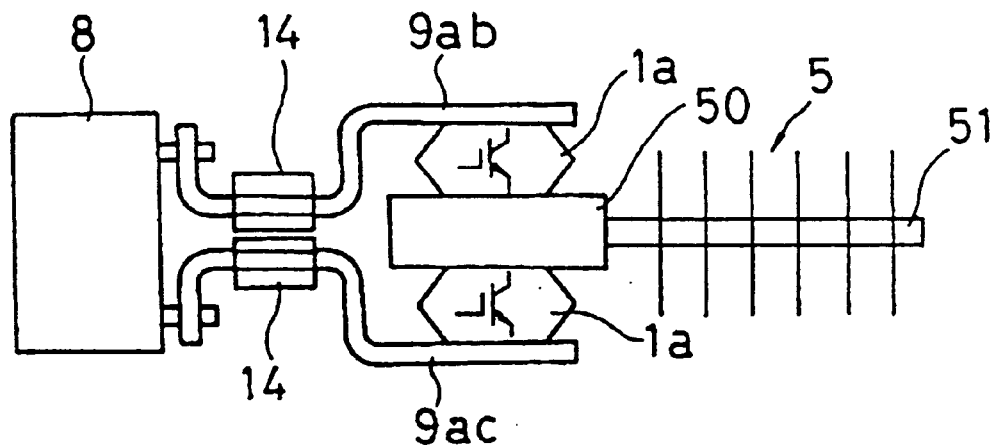
FIG. 19 is a side view showing the construction of a power conversion system in the fifteenth embodiment of the present invention.

One set of semiconductor switching circuit that is adopted in the power conversion system in this fifteenth embodiment adopts the above-mentioned semiconductor devices 1a and the semiconductor cooler 5 and by arranging two semiconductor devices 1a that are to be connected with the block portion 50 of the cooler 5 put between them and connected in series using this block portion 50 as a conductor as shown in FIG. 19.

That is, the negative pole side of the upper arm side semiconductor device 1a is brought in contact with the top of the block portion 50 and the positive pole side of the lower arm side semiconductor device 1a is brought in contact with the bottom of the block portion 50 and further, the positive pole of the upper arm side semiconductor device 1a and the negative pole of the lower arm side semiconductor device 1a are electrically connected to both ends of the capacitor 8 by one set of conductors 9ab, 9ac which are close to each other. These close conductors are electrically insulated by providing the insulator 14 to their close portion.

3 sets of thus assembled semiconductor switching circuit are provided in parallel with each other as shown in FIG. 13 likewise the ninth embodiment, the semiconductor devices 1a and the heat collecting block portion 50 are press fitted by strongly clamping them from the upper and lower sides by a compressing device and by compressing the conductors 9ab, 9ac and the semiconductor devices 1a, required portions are electrically connected so as to effectively eliminate the heat generation of the semiconductor devices 1a by the cooler 5.

Then, U, V, W-phase output conductors for a 3-phase AC motor are connected to the block portion 50 of the cooler 5 and DC input conductors are connected jointly with the conductors 9ab, 9ac to both ends of each of 3 set capacitors 8, and an inverter circuit is thus composed. On the contrary, a converter circuit is composed by connecting the U, V, W-phase input conductors for a 3-phase AC power source to the heat collecting block portion 50 that is an intermediate connecting point of each set of semiconductor switching circuit and by connecting a DC output conductor commonly to 3 sets of the conductors 9ab, 9ac.

In case of the fifteenth embodiment in the above-mentioned construction, as the block portion 50 of the cooler 5 also serves as a conductor to connect between two semiconductor devices 1a connected in series in each set of the semiconductor switching circuit, the conductor for connecting the intermediate point of two semiconductor devices 1a (equivalent to, for instance, the conductor 9f shown in FIG. 8 and FIG. 9) becomes unnecessary and further, the overall areas of the electrode surfaces of the semiconductor devices 1a are connected in the shortest distance and inductance at this portion can be reduced remarkably. Further, as the terminals of the capacitor 8 are facing the semiconductor devices 1a sides and two conductors 9ab, 9ac for connecting the semiconductor devices 1a and the capacitor 8 are close to each other, it is possible to reduce inductance of this conductor portion and it becomes easy to reduce inductance of the loop circuit.

Therefore, according to the power conversion system in the fifteenth embodiment, it is possible to get the same effect as that in the ninth embodiment and construct a power conversion portion without a snubber circuit and furthermore, because the system is in the structure that the heat collecting block portion 50 of the cooler 5 is clamped by the upper and lower semiconductor devices 1a, it is possible to reduce the number of parts and kinds and to make the system in more small size and light weight.

Further, if the terminals of the capacitor 8 are located at the positions close to the heat collecting block portion 50 in this fifteenth embodiment, the area enclosed by the loop circuit can be more small and inductance can be made more low.

Sixteenth Embodiment

Figure 20:
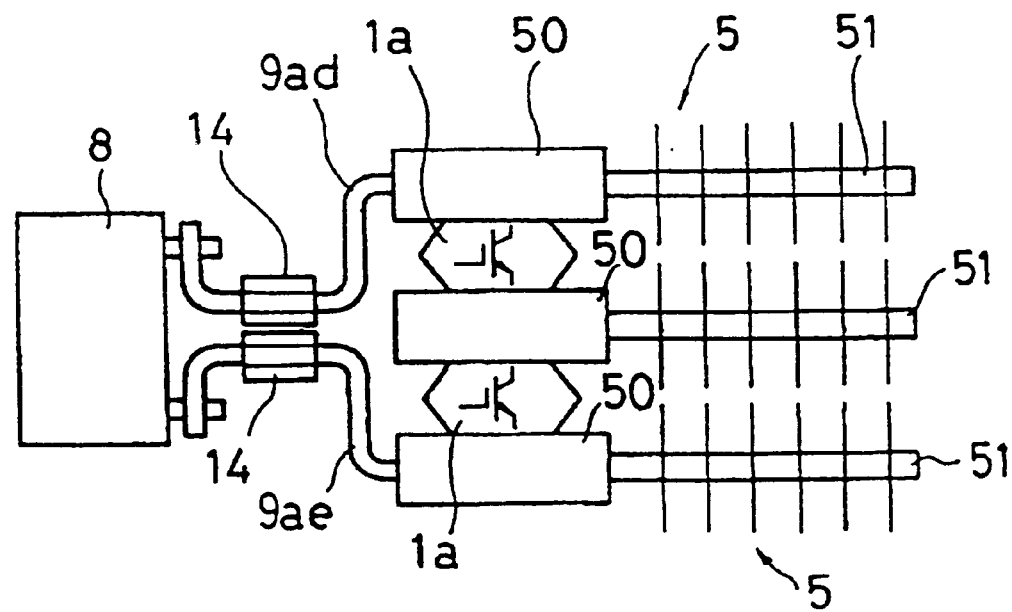
FIG. 20 is a side view showing the construction of a power conversion system in the sixteenth embodiment of the present invention.

Next, the power conversion system in the sixteenth embodiment of the present invention will be described based on FIG. 20. The sixteenth embodiment features that the heat collecting block portions 50 of the cooler 5 is compressed to the outsides of the upper and lower semiconductor devices 1a in addition to the fifteenth embodiment shown in FIG. 19, one of the ends of the conductors 9ad, 9ae is connected to these heat collecting block portions 50 and the other ends are brought in close to each other and connected to both ends of the capacitor 8.

According to this sixteenth embodiment, it is possible to get the same effect as that of the fifteenth embodiment and further improve the heat eliminating action as the upper and lower semiconductor devices 1a are sandwiched by the heat collection block portions 50 of the cooler 5 from the upper and lower sides.

Seventeenth Embodiment

Figure 21:
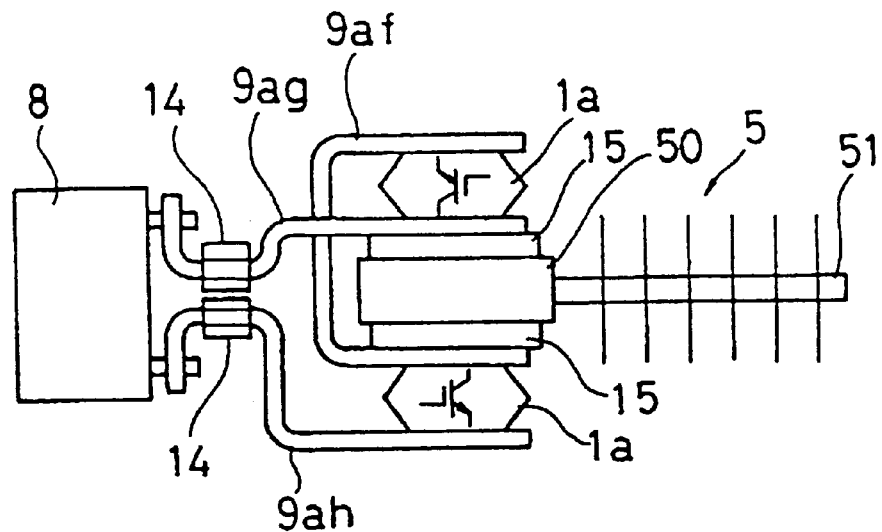
FIG. 21 is a side view showing the construction of a power conversion system in the seventeenth embodiment of the present invention.

Next, the power conversion system in the seventeenth embodiment of the present invention will be described based on FIG. 21. The seventeenth embodiment is applicable to a power conversion system that is used under conditions wherein it is expected that persons may touch the radiating portion 51 of the cooler 5 requiring radiation by exposing it to the open air and features the construction that the cooler 5 is electrically insulated from the semiconductor devices 1a.

The same semiconductor devices 1a and the cooler 5 as those in the fifteenth embodiment are adopted. Then, as shown in FIG. 21, two semiconductor devices 1a that are to be connected in series are arranged by facing the surfaces that their inner thermal resistances becomes small (here, the positive pole side surfaces of the semiconductor devices 1a) to the front and back of the heat collecting block portions 50 of the cooler 5 and press fitted to these block portions 50 via the insulating plate 15 that is formed with a material excellent in electric insulation and large thermal conductivity as aluminum nitride.

Then, the negative pole of the upper arm side semiconductor device 1a and the positive pole of the lower arm side semiconductor device 1a are connected by the conductor 9af, while the positive pole of the upper arm side semiconductor 1a and the negative pole of the lower arm side semiconductor device 1a are connected to both sides of the capacitor 8 by one set of conductors 9ag, 9ah that are close each other. These conductors 9ag and 9ah are electrically insulated by the insulator 14 provided at the portion near them.

3 sets of the thus assembled semiconductor switching circuit are provided in parallel as shown in FIG. 13 likewise the fifteenth embodiment and by press fitting the semiconductor devices 1a and the heat collecting block portion 50 via the insulating plate 15 simultaneously by strongly clamping them by the compressing device and further, required parts are electrically connected by press fitting the upper and lower semiconductor devices 1a and the conductors 9af, 9ag, 9ah so that the heat generation of the semiconductor devices 1a can be eliminated effectively by the cooler 5.

Then, by connecting the U, V, W-phase output conductors of the 3-phase AC motor to the conductor 9af of the block portion 50 of the cooler 5 and DC input conductors to both ends of the capacitor 8 of each of 3 sets jointly with the conductors 9ag, 9ah, an inverter circuit is constructed. On the contrary, a converter circuit is constructed by connecting the U, V, W-phase input conductors of the 3-phase AC power source to the conductor 9af which is the intermediate connection of the semiconductor switching circuit of each set and by connecting a DC output conductor commonly to the conductors 9ag, 9ah of each of 3 sets.

In case of the seventeenth embodiment in the above-mentioned construction, the same effect as that of the ninth embodiment is obtained and a power conversion portion can be constructed without a snubber circuit. In addition, as the heat collecting block portion 50 of the cooler 5 is clamped by the upper and lower semiconductor devices 1a, it is possible to reduce the number of parts and kinds and to realize a small sized and light weighted system.

Further, in the nineteenth embodiment, if the terminals of the capacitor 8 are located at the positions close and opposite to the heat collecting block portion 5, the area enclosed by the looped circuit can be made more small and inductance to the more low level.

Eighteenth Embodiment

Figure 22:
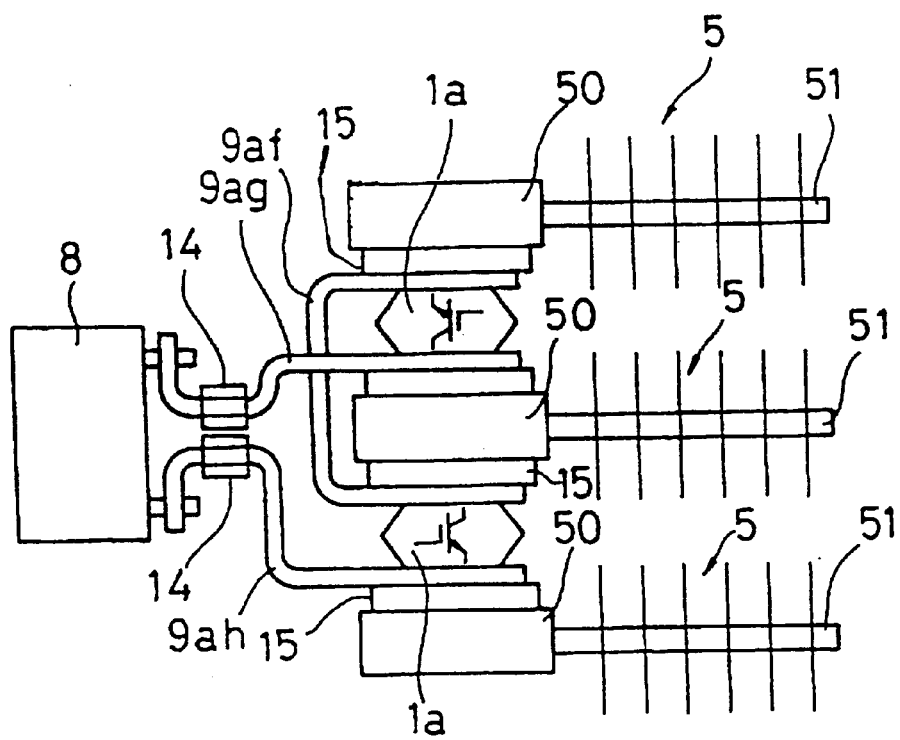
FIG. 22 is a side view showing the construction of a power conversion system in the eighteenth embodiment of the present invention.

Next, the power conversion system in the eighteenth embodiment of the present invention will be described in detail based on FIG. 22. The power conversion system in this eighteenth embodiment features that the heat collecting block portion 50 of the cooler 5 is also provided via the insulating plate 15 to the outside of each of two series connected upper and lower semiconductor devices 1a in the seventeenth embodiment shown in FIG. 21. Other constructions are common to those of the seventeenth embodiment.

According to this eighteenth embodiment, the semiconductor devices 1a are sandwiched by the heat collecting block portions 50 of the cooler 5 likewise the sixteenth embodiment and in addition to the same effect as that in the seventeenth embodiment, the semiconductor devices can be efficiently cooled.

Nineteenth Embodiment

Next, the power conversion system in the nineteenth embodiment of the present invention will be described based on FIG. 23. This nineteenth embodiment features that modular type semiconductor devices 1b similar to those in the ninth embodiment shown in FIG. 12 are adopted and the cooling and mounting surface sides of two semiconductor devices 1b that are to be series connected for comprising one set of semiconductor switching circuits against the cooler 5 comprising the heat collecting block portion 50 and the radiating portion 51 are mounted back to back to the front and the back of the heat collecting block portion 50 so that the negative pole terminal of the upper arm side semiconductor device 1b and the positive pole terminal of the lower arm side semiconductor device 1b are at the positions opposite to each other.

Then, the negative pole terminal of the upper arm side semiconductor device 1b and the positive pole terminal of the lower arm side semiconductor device 1b are connected by the conductor 9ai and further, the positive pole terminal of the upper arm side semiconductor device 1b and the negative pole terminal of the lower arm side semiconductor device 1b are connected to both terminals of the capacitor 8, respectively by the conductors 9aj, 9ak that are close to each other.

Figure 23:
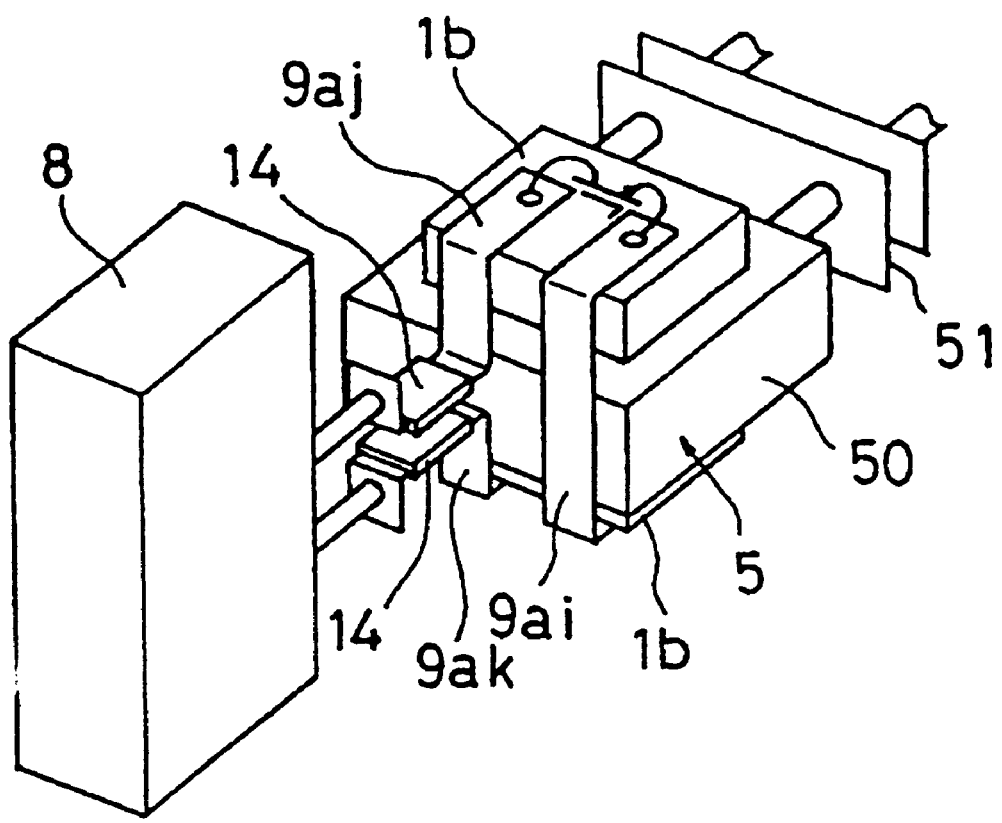
FIG. 23 is a perspective view showing the construction of a power conversion system in the nineteenth embodiment of the present invention.

The power conversion system in this nineteenth embodiment constructs an inverter circuit or a converter circuit when 3 sets of the semiconductor switching circuit shown in FIG. 23 are provided in parallel and connected to an outside circuit likewise other embodiments.

According to the power conversion system in the nineteenth embodiment, likewise other embodiments, a power conversion system without a snubber circuit can be constructed and in addition, by adopting modular type semiconductor devices, even when their cooling and mounting surface sides are brought in directly contact with the heat collecting block portion 50 without an insulating plate, insulation of the cooler 5 can be maintained and it becomes possible to construct a small and light system accordingly.

Twentieth Embodiment

Next, the power conversion system in the twentieth embodiment will be described based on FIG. 24. In the twentieth embodiment, module type semiconductor devices 1b are adopted, two upper and lower semiconductor devices 1b to be connected in series for comprising a semiconductor switching circuit are arranged at the positions so that their terminal surfaces face each other and the negative pole terminal of one of the semiconductor devices faces to the positive pole terminal of the other semiconductor device, the heat collecting block portions 50 of the coolers 5 are mounted to the cooling and mounting surfaces at the outsides of both semiconductor devices 1b, the negative pole terminal of the upper arm side semiconductor device 1b and the positive pole terminal of the lower arm side semiconductor device 1b that are close and facing each other are connected by a conductor 9am and further, the positive pole terminal of the upper arm side semiconductor device 1b and the negative pole side terminal of the lower arm are connected to both terminals of the capacitor 8 by conductors 9an, 9ap that are close to each other and thus, the semiconductor switching circuit is constructed.

Figure 24:
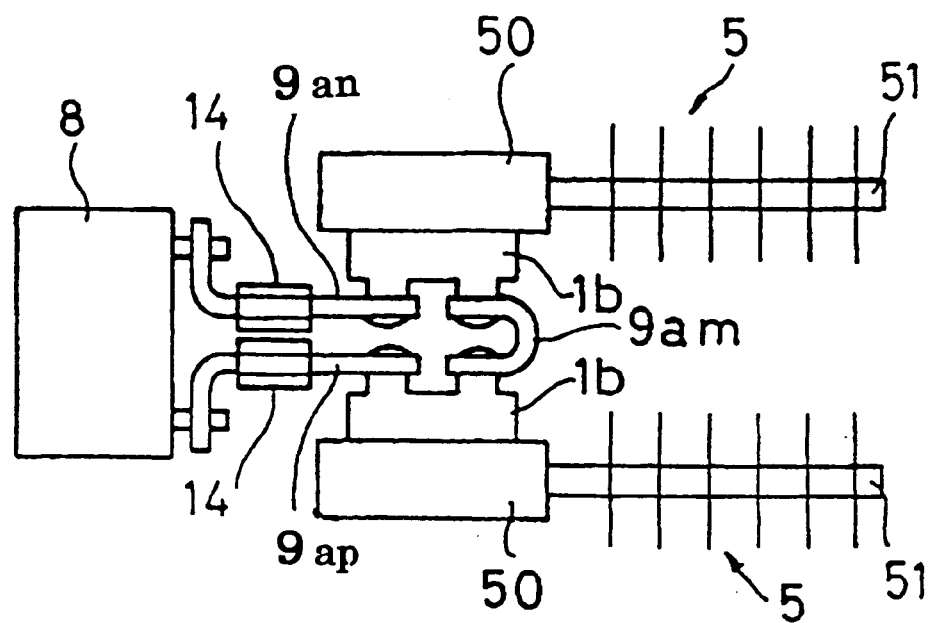
FIG. 24 is a side view showing the construction of a power conversion system in the twentieth embodiment of the present invention.
Figure 25:
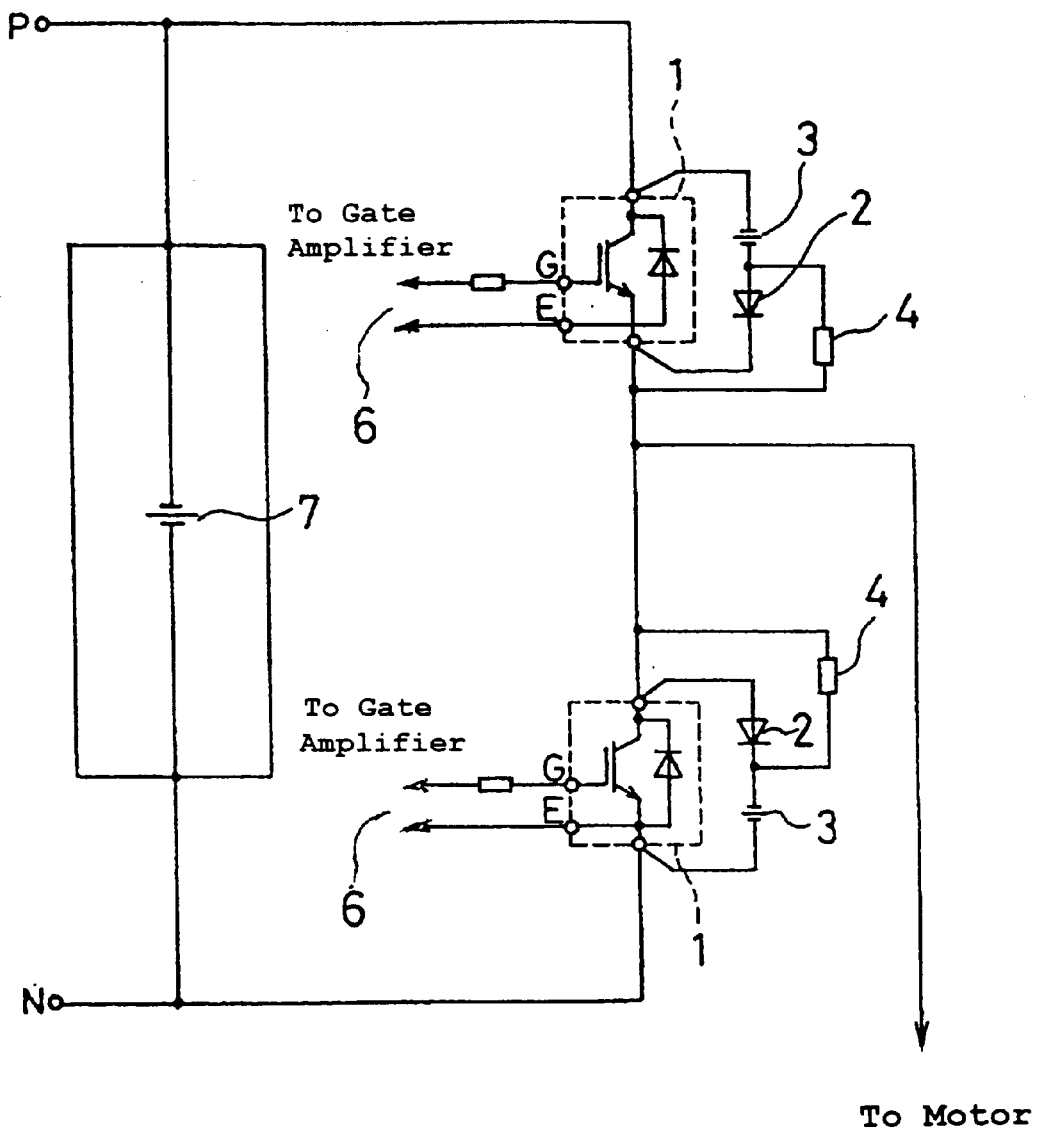
FIG. 25 is a circuit diagram of a semiconductor switching circuit in a conventional example.
Figure 26:
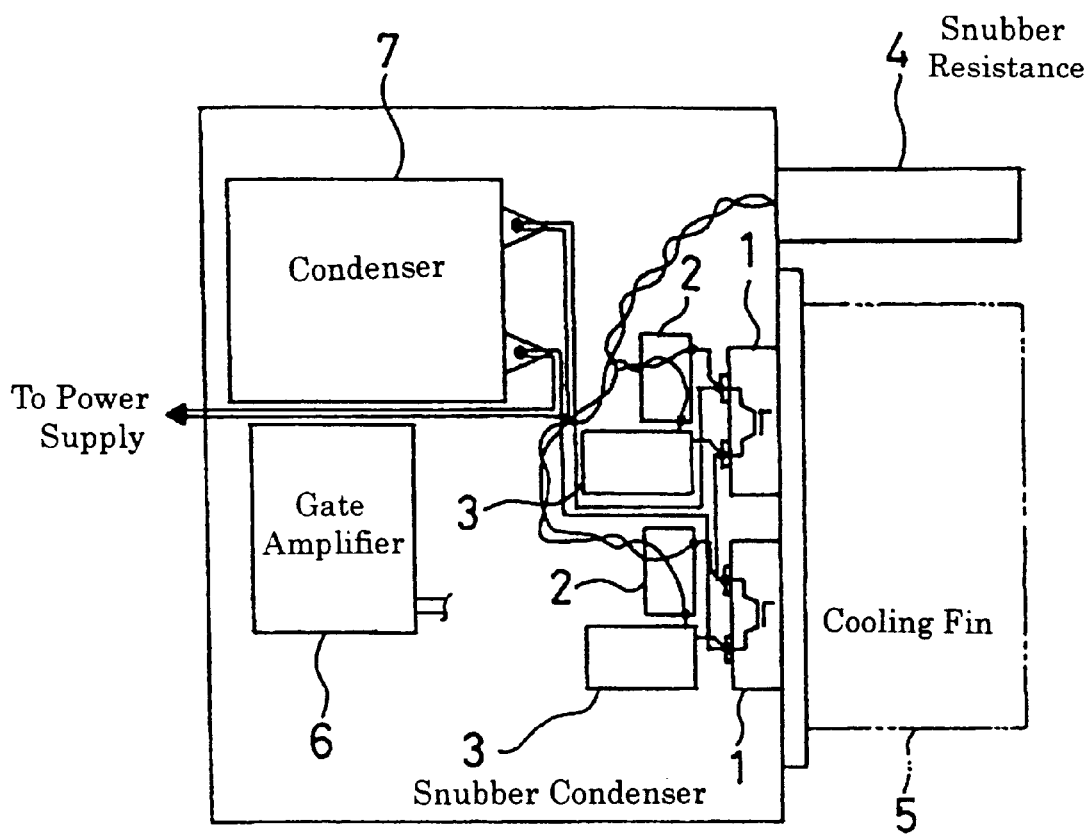
FIG. 26 is a block diagram showing the arrangement of parts of a semiconductor switching circuit in a conventional example.
Figure 27:
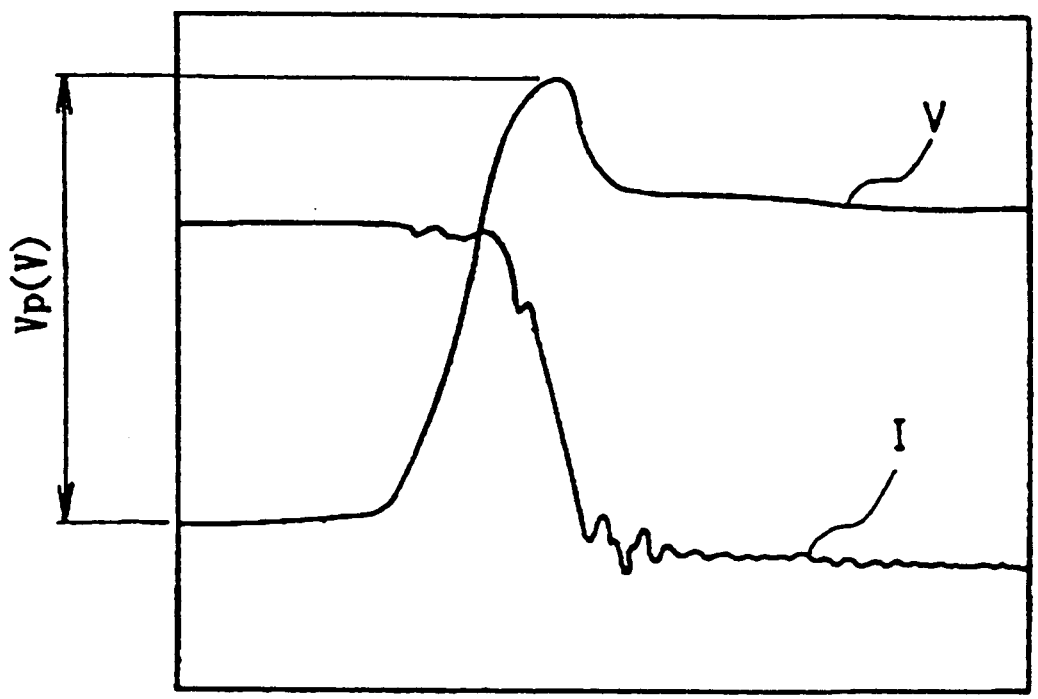
FIG. 27 is a time chart showing the breaking characteristic of a semiconductor switching circuit.
Figure 28:
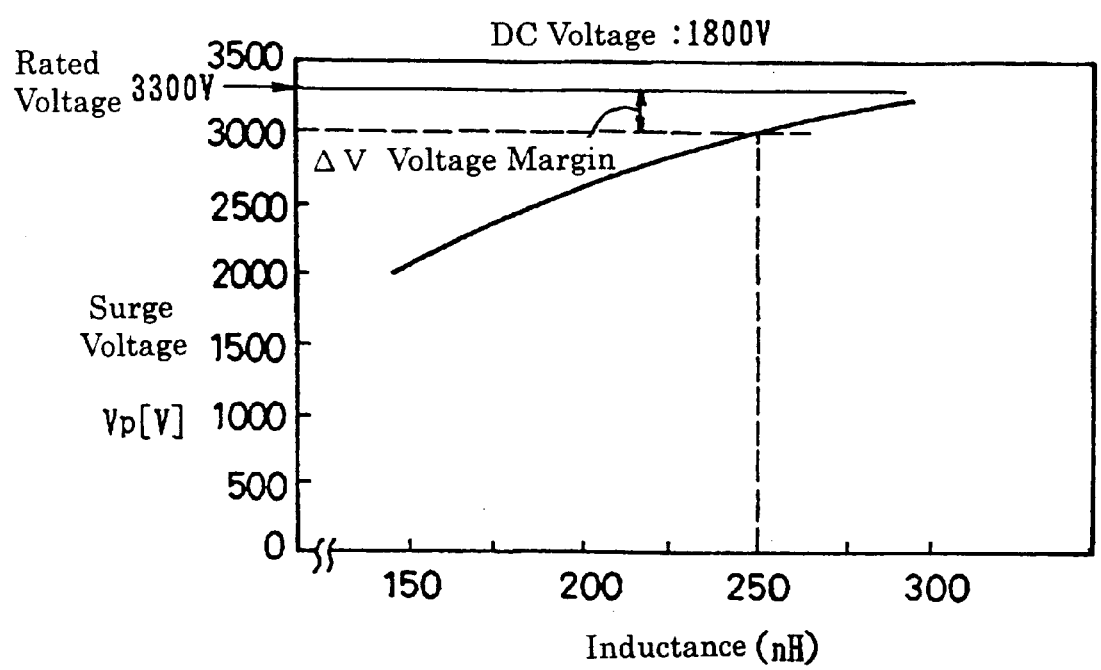
FIG. 28 is a graph showing the relationship between inductance and surge voltage of a loop circuit of a semiconductor switching circuit.

In the power conversion system in this twentieth embodiment, likewise other embodiment, an inverter circuit or a converter circuit is constructed by providing 3 sets of the semiconductor switching circuit shown in FIG. 24 in parallel and connecting to an outer circuit.

According to the power conversion system in his twentieth embodiment, likewise other embodiments, there is an effect that a power conversion system without a snubber circuit can be constructed and in addition, by adopting modular type semiconductor devices, even when their cooling and mounting surface sides are brought in directly contact with the heat collecting block portion 50 without an insulating plate, insulation of the cooler 5 can be maintained and it becomes possible to construct a small and light system accordingly, and furthermore, it is possible to increase the cooling effect by installing a separate cooler 5 to each of the semiconductor device 1b.

Further, if an interference is caused among the conductors in all the embodiments, the interference can be avoided by perforating a hole, bending or notching the portions causing the interference.

Further, in the sixth embodiment shown in FIG. 8 through the twentieth embodiment shown in FIG. 24, it is possible to make the construction to use the first capacitor 11 in the small capacity and low inductance surge voltage absorbing instead of the capacitor 8 as shown in FIG. 3 and FIG. 4 and connect the second capacitor 12 as a filter capacitor to it.

What is claimed is:

1. A power conversion system characterized in that capacitors that serve as capacitors for filtering and absorbing surge voltage are connected to both ends of series-connected semiconductor devices that are voltage driven high frequency switching devices in parallel, the connecting terminals of these capacitors are arranged so that they are brought immediately close to the terminal positions of the semiconductor devices, more than two sets of semiconductor switching circuits with inductance of which loop circuit comprising the semiconductor devices and capacitors reduced to below 250 nH are connected in parallel and both ends and an intermediate connecting point of the series-connected semiconductor devices in each semiconductor switching circuits are used as the main circuit terminals for external connection.

2. A power conversion system according to claim 1, characterized in that the capacitors comprise more than two capacitors with the same small capacity connected in parallel with each other.

3. A power conversion system according to claim 1 or 2, characterized in that the capacitors use their cases as the electrode terminal of either one of the capacitors.

4. A power conversion system according to claim 1, characterized in that the capacitors are arranged so that the electrode terminals face the direction of the semiconductor devices.

5. A power conversion system according to claim 4, characterized in that the terminals of the capacitors are arranged immediately close to the intermediate position of the series-connected semiconductor devices.

6. A power conversion system according to claim 4, characterized in that the terminals of the capacitors are arranged immediately close to both end positions of the series-connected semiconductor devices.

7. A power conversion system characterized in that the first capacitor for surge voltage absorbing and the second capacitor as a filter capacitor with the capacity larger than that of the first capacitor are connected to both ends of the series-connected semiconductor devices that are voltage driven high frequency switching devices, the first capacitor is arranged at a position closer to the semiconductor devices than the second capacitor, more than two sets of semiconductor switching circuits with inductance of which loop circuit comprising the semiconductor devices and the first capacitor is reduced to below 250 nH are connected in parallel, and both ends and intermediate connecting point of the series-connected semiconductor devices in each semiconductor switching circuits are used as the main circuit terminals for the external connection.

8. A power conversion system according to claim 7, characterized in that the first capacitor comprises more than two capacitors with the same capacity connected in parallel.

9. A power conversion system according to claim 7 or 8, characterized in that the first capacitor uses the case as one of the electrode terminals of the first capacitor.

10. A power conversion system according to claim 7, characterized in that the first capacitor is arranged so that its electrode terminals face the direction of the semiconductor devices.

11. A power conversion system according to claim 10, characterized in that the terminals of the first capacitor are arranged immediately close to the intermediate position of the series-connected semiconductor devices.

12. A power conversion system according to claim 10, characterized in that the terminals of the first capacitor are arranged immediately close to both ends of the series-connected semiconductor devices.

13. A power conversion system according to claim 7, characterized in that the semiconductor devices, first capacitor and second capacitor are arranged hierarchically, the first capacitor is connected to both ends of the series-connected semiconductor devices and the second capacitor is connected to the connecting point, that is, the electrode terminal of the first capacitor.

14. A power conversion system according to claim 7, characterized in that the number of units of the second capacitor is reduced to less than the number of sets of the semiconductor switching circuits that are connected in parallel and more than two sets of the semiconductor switching circuits connected in parallel are connected commonly to at least one unit of the second capacitors.

15. A power conversion system according to claim 7, characterized in that the second capacitor is constructed as a filter capacitor with required capacity by a main capacitor in the main circuit unit including the semiconductor devices and auxiliary capacitor installed at the outside of the main circuit unit.

16. A power conversion system including more than two sets of semiconductor switching circuits connected in parallel comprising surge voltage absorbing capacitor connected in parallel to both ends of series-connected semiconductor devices that are voltage driven high-frequency switching devices and both ends and the intermediate connecting point of the series-connected semiconductor devices in the semiconductor switching circuits are made the main circuit terminal for external connection, wherein the semiconductor devices are press fit shape semiconductor devices of which both surfaces serve as the electrode surfaces, the positive pole sides or the negative pole sides of each semiconductor devices of an upper arm side and a lower arm side in the series-connected semiconductor devices of the semiconductor switching circuits are press fitted by way of an insulating plate having large thermal conductivity on the same plane of semiconductor device cooler, and the negative poles of the upper arm side semiconductor devices and the positive poles of the lower arm side semiconductor devices are connected by conductors and the positive poles of the upper arm side semiconductor devices and the negative poles of the lower arm side semiconductor devices are connected by one set of conductors which are close to both sides of the capacitors.

17. A power conversion system including more than two sets of semiconductor switching circuits connected in parallel comprising surge voltage absorbing capacitors connected in parallel to both ends of series-connected semiconductor devices that are voltage driven high-frequency switching devices and both ends and the intermediate connecting point of the series-connected semiconductor devices in the semiconductor switching circuits are made the main circuit terminal for external connection, wherein the semiconductor devices are press fit shape semiconductor devices of which both surfaces serve as the electrode surfaces, the negative pole side of the upper arm side semiconductor device and the positive side of the lower arm side semiconductor device of the series-connected semiconductor devices of the semiconductor switching circuits are press fitted on the same plane of the semiconductor device cooler of good conductivity, and the positive pole of the upper arm side semiconductor device and the negative pole of the lower arm side semiconductor device are connected respectively by one set of conductors that are close to both terminals of the capacitors.

18. A power conversion system including more than two sets of semiconductor switching circuits connected in parallel comprising surge voltage absorbing capacitors connected in parallel to both ends of series-connected semiconductor devices that are voltage driven high-frequency switching devices and both ends and the intermediate connecting point of the series-connected semiconductor devices in the semiconductor switching circuits as the main circuit terminals for external connection, wherein the semiconductor devices are press fit shape semiconductor devices of which both surfaces serve as the electrode surfaces, the negative pole side of the upper arm side semiconductor device and the positive pole side of the lower arm side semiconductor devices of the series-connected semiconductor devices of the semiconductor switching circuits are press fitted on the same plane of the semiconductor device cooler with a common conductor put between them, and the positive pole of the upper arm side semiconductor device and the negative pole of the lower arm side semiconductor device are connected respectively by one set of conductors that are close to both terminals of the capacitors.

19. A power conversion system including more than two sets of semiconductor switching circuits connected in parallel comprising surge voltage absorbing capacitors connected in parallel to both ends of series-connected semiconductor devices that are voltage driven high-frequency switching devices and both ends and the intermediate connecting point of the series-connected semiconductor devices in the semiconductor switching circuits as the main circuit terminals for external connection, wherein the semiconductor devices are press fitted shape semiconductor devices of which both surfaces serve as the electrode surfaces, the positive pole sides of the upper arm side semiconductor devices and the negative pole sides of the lower arm side semiconductor devices of the series-connected semiconductor devices of the semiconductor switching circuits are press fitted on the same plane of the semiconductor device cooler by way of an insulating plate of large thermal conductivity, and the negative pole sides of the upper arm side semiconductor devices and the positive pole sides of the lower arm side semiconductor devices are connected by conductors, and the positive pole of the upper arm side semiconductor device and the negative pole of the lower arm side semiconductor device are connected respectively by one set of conductors that are close to both terminals of the capacitors.

20. A power conversion system including more than two sets of semiconductor switching circuits connected in parallel comprising surge voltage absorbing capacitors connected in parallel to both ends of series-connected semiconductor devices that are voltage driven high-frequency switching devices and both ends and the intermediate connecting point of the series-connected semiconductor devices in the semiconductor switching circuits as the main circuit terminals for external connection, wherein the semiconductor devices are modular type semiconductor devices provided with the positive pole terminals and the negative pole terminals on one of the surfaces and the opposite surfaces are flat cooling and mounting surfaces, the series-connected semiconductor devices of the semiconductor switching circuits are mounted on the same plane of the semiconductor device coolers with the negative terminal sides of the upper arm side semiconductor devices and the positive pole sides of the lower arm side semiconductor devices arranged in parallel with and adjoining each other in the same directions, and the negative pole sides of the upper arm side semiconductor devices and the positive pole sides of the lower arm side semiconductor devices are connected by conductors, and the positive pole of the upper arm side semiconductor device and the negative pole of the lower arm side semiconductor device are connected respectively by one set of conductors that are close to both terminals of the capacitors.

21. A power conversion system including more than two sets of semiconductor switching circuits connected in parallel comprising surge voltage absorbing capacitors connected in parallel to both ends of series-connected semiconductor devices that are voltage driven high-frequency switching devices and both ends and the intermediate connecting point of the series-connected semiconductor devices in the semiconductor switching circuits as the main circuit terminals for external connection, wherein the semiconductor devices are modular type semiconductor devices provided with the positive pole terminals and the negative pole terminals on one of the surfaces and the opposite surfaces are flat cooling and mounting surfaces, the series-connected semiconductor devices of the semiconductor switching circuits are mounted on the same plane of the semiconductor device coolers in the arrangement so that the line connecting the positive pole terminals and the negative pole terminals of the upper arm side semiconductor devices becomes in parallel with the line connecting the positive pole terminal and the negative pole terminal of the lower side arm semiconductor devices and the positive and negative directions become opposite each other, and the negative pole sides of the upper arm side semiconductor devices and the positive pole sides of the lower arm side semiconductor devices are connected by conductors, and the positive pole of the upper arm side semiconductor device and the negative pole of the lower arm side semiconductor device are connected respectively by one set of conductors that are close to both terminals of the capacitors.

22. A power conversion system according to any one of claims 16 through 21, characterized in that each of the semiconductor devices is brought in contact with a separate semiconductor device cooler.

23. A power conversion system according to claim 22, characterized in that the radiation capacity of a semiconductor device cooler located at the downstream side of the flow of air warmed by the radiation of the semiconductor device cooler of the series-connected semiconductor devices is increased higher than that of the semiconductor device cooler located at the upper stream side.

24. A power conversion system according to any one of claims 16 through 21, characterized in that the series-connected semiconductor devices are brought in contact with the same semiconductor device cooler in the state where they are shifted to the upper stream side of the flow of air warmed by the radiation of the semiconductor device cooler.

25. A power conversion system including more than two sets of semiconductor switching circuits connected in parallel comprising surge voltage absorbing capacitors connected in parallel to both ends of series-connected semiconductor devices that are voltage driven high-frequency switching devices and both ends and the intermediate connecting point of the series-connected semiconductor devices in the semiconductor switching circuits as the main circuit terminals for external connection, wherein the semiconductor devices are press fit semiconductor devices of which both surfaces serve as the electrode surfaces, the negative pole side of the upper arm side semiconductor device and the positive pole side of the lower arm side semiconductor device of the series-connected semiconductor devices of the semiconductor switching circuit are press fitted to the front and back of the heat collecting block portion of the semiconductor device cooler having a flat and good conductive heat collecting block portion and a radiating portion to radiate the heat collected by this heat collecting block portion, respectively, the positive pole of the upper arm side semiconductor device and the negative pole of the lower arm side semiconductor device are connected by one set of conductors that are close to both terminals of the capacitor, respectively.

26. A power conversion system including more than two sets of semiconductor switching circuits connected in parallel comprising surge voltage absorbing capacitors connected in parallel to both ends of series-connected semiconductor devices that are voltage driven high-frequency switching devices and both ends and the intermediate connecting point of the series-connected semiconductor devices in the semiconductor switching circuits as the main circuit terminals for external connection, wherein the semiconductor devices are press fit semiconductor devices of which both surfaces serve as the electrode surfaces, the negative pole side of the upper arm side semiconductor device and the positive pole side of the lower arm side semiconductor device of the series-connected semiconductor devices of the semiconductor switching circuit are press fitted to the front and back of the heat collecting block portion of the semiconductor device cooler having a flat and good conductive heat collecting block portion and a radiating portion o radiate the heat collected by this heat collecting block portion, respectively, the heat collecting block portions of separate two semiconductor device coolers that have flat good conductive heat collecting block portions and radiating portions to radiate the heat collected by this heat collecting block portions are press fit to the positive pole side of the upper arm side semiconductor device and the negative pole side of the lower arm side semiconductor device, respectively, and the heat collecting block portion of the separate semiconductor device cooler to which the positive pole side of the upper arm side semiconductor device is press fitted and the heat collecting bock portion of the separate semiconductor device cooler to which the negative pole side of the lower arm side semiconductor device is press fitted are connected to both terminals of the capacitor by one set of conductors that are close to each other.

27. A power conversion system including more than two sets of semiconductor switching circuits connected in parallel comprising surge voltage absorbing capacitors connected in parallel to both ends of series-connected semiconductor devices that are voltage driven high-frequency switching devices and both ends and the intermediate connecting point of the series-connected semiconductor devices in the semiconductor switching circuits as the main circuit terminals for external connection, wherein the semiconductor devices are press fit semiconductor devices of which both surfaces serve as the electrode surfaces, the same positive pole surface sides or the negative pole surface sides of the series-connected semiconductor devices of the semiconductor switching circuits are press fitted to the front and back of the heat collecting block portion of the semiconductor device cooler having the flat heat collecting block portion and the radiating portion to radiate the heat collected by this heat collecting block portion by way of electric insulating plate having large thermal conductivity, respectively, the negative pole side of the upper arm side semiconductor device and the positive pole side of the lower arm side semiconductor device of the series-connected semiconductor devices are connected by conductors, and the positive pole of the upper arm side semiconductor device and the negative pole of the lower arm side semiconductor device are connected to both terminals of the capacitor by one set of conductors that are close to each other.

28. A power conversion system including more than two sets of semiconductor switching circuits connected in parallel comprising surge voltage absorbing capacitors connected in parallel to both ends of series-connected semiconductor devices that are voltage driven high-frequency switching devices and both ends and the intermediate connecting point of the series-connected semiconductor devices in the semiconductor switching circuits as the main circuit terminals for external connection, wherein the semiconductor devices are press fit semiconductor devices of which both surfaces serve as the electrode surfaces, the same positive pole surface sides or the negative pole surface sides of the series-connected semiconductor devices of the semiconductor switching circuits are press fitted to the front and back of the heat collecting block portion of the semiconductor device cooler having the flat heat collecting block portion and the radiating portion to radiate the heat collected by this heat collecting block portion by way of electric insulating plate having large thermal conductivity, the heat collecting block portions of separate two semiconductor device coolers that have flat heat collecting block portions and radiating portions to radiate the heat collected by this heat collecting block portions are press fit to the electrode surface positioned at the outside of the upper arm side semiconductor device and the electrode side positioned at the outside of the lower arm side semiconductor device, respectively by way of an insulating plate having large thermal conductivity, the negative pole side of the upper arm side semiconductor device and the positive pole side of the lower arm side semiconductor device of the series-connected semiconductor devices are connected by conductor, and the positive pole of the upper arm side semiconductor device and the negative pole of the lower arm side semiconductor device are connected to both terminals of the capacitor by one set of conductors that are close to each other.

29. A power conversion system including more than two sets of semiconductor switching circuits connected in parallel comprising surge voltage absorbing capacitors connected in parallel to both ends of series-connected semiconductor devices that are voltage driven high-frequency switching devices and both ends and the intermediate connecting point of the series-connected semiconductor devices in the semiconductor switching circuits as the main circuit terminals for external connection, wherein the semiconductor device is modular type semiconductor device provided with the positive and negative terminals on one of its surfaces and the opposite surface is a flat cooling and mounting surface, the series-connected semiconductor devices of the semiconductor switching circuits are so arranged that the mount surfaces face each other and the negative pole terminal of one of the semiconductor devices is positioned on the back side of the positive pole terminal of the other semiconductor device, the mounting surface sides of the series-connected semiconductor devices of the semiconductor switching circuits are mounted on the front and back sides of the heat collecting block portions of the semiconductor device cooler that has a flat heat collecting block portion and a radiating portion to radiate the heat collected by this heat collecting block portion, respectively, the negative pole terminal of the upper arm side semiconductor device and the positive pole terminal of the lower arm side semiconductor device of the series-connected semiconductor devices are connected by a conductor, and the positive pole terminal of the upper arm side semiconductor device and the negative pole terminal of the lower arm side semiconductor device are connected to both terminals of the capacitor by one set of conductors that are close to each other.

30. A power conversion system including more than two sets of semiconductor switching circuits connected in parallel comprising surge voltage absorbing capacitors connected in parallel to both ends of series-connected semiconductor devices that are voltage driven high-frequency switching devices and both ends and the intermediate connecting point of the series-connected semiconductor devices in the semiconductor switching circuits as the main circuit terminals for external connection, wherein the semiconductor device is a modular type semiconductor device provided with the positive and negative terminals on one of its surfaces and the opposite surface is a flat cooling and mounting surface, the series-connected semiconductor devices of the semiconductor switching circuits are so arranged that the mounting surfaces come to the outside and the positive pole terminal and negative pole terminal face each other, the heat collecting block portions of semiconductor device coolers that have a flat heat collecting block portion and a radiating portion to radiate the heat collected by this heat collecting block portion are mounted on the mounting surfaces of the series-connected semiconductor devices, the negative pole terminal of the upper arm side semiconductor device and the positive pole terminal of the lower arm side semiconductor device of the series-connected semiconductor devices are connected by a conductor, and the positive pole terminal of the upper arm side semiconductor device and the negative pole terminal of the lower arm side semiconductor device are connected to both terminal of the capacitor, respectively by one set of conductors that are close to each other.

31. A power conversion system according to claim 16, characterized in that the capacitor is one capacitor that serves as a filter capacitor and for surge voltage absorbing.

32. A power conversion system according to claim 16, characterized in that the capacitor is the first capacitor out of the first capacitor for surge voltage absorbing and the second capacitor as a filter capacitor.

* * * * *